(12) United States Patent
Downs et al.

(10) Patent No.: US 12,155,893 B2
(45) Date of Patent: Nov. 26, 2024

(54) SYSTEMS AND METHODS FOR AUDIENCE BASED DOCUMENT GENERATION AND COMMUNICATION TARGETING

(71) Applicant: Open Text Corporation, Waterloo (CA)

(72) Inventors: James Matthew Downs, Lexington, KY (US); Jack Dwane Gilvin, Nicholasville, KY (US); Randall Scott Sparks, Lexington, KY (US); Shawn Ashley Doyle, Winchester, KY (US)

(73) Assignee: OPEN TEXT CORPORATION, Menlo Park, CA (US)

( * ) Notice: Subject to any disclaimer, the term of this patent is extended or adjusted under 35 U.S.C. 154(b) by 219 days.

(21) Appl. No.: 17/742,225

(22) Filed: May 11, 2022

(65) Prior Publication Data
US 2023/0370677 A1 Nov. 16, 2023

(51) Int. Cl.
*H04N 21/442* (2011.01)
*G06Q 30/02* (2023.01)
*H04N 21/45* (2011.01)
*H04N 21/658* (2011.01)

(52) U.S. Cl.
CPC ....... *H04N 21/44213* (2013.01); *G06Q 30/02* (2013.01); *H04N 21/4532* (2013.01); *H04N 21/6582* (2013.01)

(58) Field of Classification Search
CPC ......... H04N 21/44213; H04N 21/4532; H04N 21/6582; G06Q 30/02
See application file for complete search history.

(56) References Cited

U.S. PATENT DOCUMENTS

2001/0056460 A1* 12/2001 Sahota ............. H04N 21/25883
348/E7.054
2012/0101871 A1* 4/2012 Lieberman ......... G06Q 30/0269
705/7.29

* cited by examiner

*Primary Examiner* — Alazar Tilahun
(74) *Attorney, Agent, or Firm* — Sprinkle IP Law Group

(57) ABSTRACT

Systems and methods for the design, deployment and utilization of targeted communications based upon audiences are disclosed. More specifically, embodiments may allow the targeting of communications to users based on a user's audience affiliation and may allow the dynamic targeting of communications based on an audience with which a user is affiliated, including audiences determined from user interactions with a web site.

18 Claims, 19 Drawing Sheets

FIG. 6D

Variation attributes
Modify the attributes of the variation

Variation title
Life Insurance - Campaign - Growing Family

| | | |
|---|---|---|
| ☐ Safe Driving | Page Title: contains "auto" Page Title: contains "interest" Page Title: contains "safe" | website / Google Analytics / CDP Insurance Demo eimdemo / https://cdp-ts.eimdemo.com |
| ☑ Growing Family | Page Title: contains "life" Page Title: contains "insurance" Page Title: contains "family" | website / Google Analytics / CDP Insurance Demo eimdemo / https://cdp-ts.eimdemo.com |
| ☐ Valuable Property Interest | Page Title: contains "valuable" Page Title: contains "property" | https://cdp-teamsite.eimdemo.com / website / Google Analytics / CDP Insurance Demo eimdemo |
| ☐ Pets | Page Title: contains "home" Page Title: contains "owner" Page Title: contains "pets" | website / Google Analytics / CDP Insurance Demo eimdemo / https://cdp-ts.eimdemo.com |
| ☐ Marriage | Page Title: contains "life" Page Title: contains "insurance" Page Title: contains "marriage" | website / Google Analytics / CDP Insurance Demo eimdemo / https://cdp-ts.eimdemo.com |

Cancel   Create

FIG. 6G1

FIG. 6G2

FIG. 6H

| | | |
|---|---|---|
| Estimate costs for coverage | | |
| *Your life insurance quote* | | |
| 10 Year Term | 20 Year Term | 30 Year Term |
| Premium $21/mo | Premium $32/mo | Premium $49/mo |

Selected amount of coverage:

$750,000

[CLICK HERE TO SIGN UP]

Find the Right Life Insurance Solution

As your life changes, the best type of life insurance to meet your needs can change too. Find out whether term insurance, permanent insurance, or a combination of both is right for the stage of life you are in now.

[Additional info]

| Schedule a consultation | Let's chat | Find a personal rep |
|---|---|---|
| Schedule | 800-555-1234 | Find a professional |

FIG. 6I

| | | |
|---|---|---|
| | Estimate costs for coverage | |
| | Your life insurance quote | |
| 10 Year Term | 20 Year Term | 30 Year Term |
| Premium $21/mo | Premium $32/mo | Premium $49/mo |

Selected amount of coverage:

$750,000

[CLICK HERE TO SIGN UP]

Life Insurance for New Families

Consider changing to a whole life insurance plan which gives you protection for your whole life and has premiums that stay the same even if your health condition changes. Universal life insurance offers long-term coverage with flexible premiums.

[Whole life options]

| Schedule a consultation | Let's chat | Find a personal rep |
|---|---|---|
|  |  |  |
| Schedule | 800-555-1234 | Find a professional |

| Audiences | | |
|---|---|---|
| Name | Description | Tags |
| ☐ Home Owners Interest | Page Title: contains "home" Page Title: contains "owner" | https://cdp-teamsite.eimdemo.com  website  Google Analytics  CDP Insurance Demo eimdemo |
| ☐ Renters Interest | Page Title: contains "rent" Page Title: contains "interest" | https://cdp-teamsite.eimdemo.com  website  Google Analytics  CDP Insurance Demo eimdemo |
| ☐ Valuables | Page Title: contains "home" Page Title: contains "owner" Page Title: contains "valuables" | website  Google Analytics  CDP Insurance Demo eimdemo  https://cdp-ts.eimdemo.com |
| ☐ Safe Driving | Page Title: contains "auto" Page Title: contains "interest" Page Title: contains "safe" | website  Google Analytics  CDP Insurance Demo eimdemo  https://cdp-ts.eimdemo.com |
| ☑ Growing Family | Page Title: contains "life" Page Title: contains "insurance" Page Title: contains "family" | website  Google Analytics  CDP Insurance Demo eimdemo  https://cdp-ts.eimdemo.com |
| ☐ Valuable Property Interest | Page Title: contains "valuable" Page Title: contains "property" | https://cdp-teamsite.eimdemo.com  website  Google Analytics  CDP Insurance Demo eimdemo |
| ☐ Pets | Page Title: contains "home" Page Title: contains "owner" Page Title: contains "pets" | website  Google Analytics  CDP Insurance Demo eimdemo  https://cdp-ts.eimdemo.com |
| ☐ Marriage | Page Title: contains "life" Page Title: contains "insurance" Page Title: contains "marriage" | website  Google Analytics  CDP Insurance Demo eimdemo  https://cdp-ts.eimdemo.com |
| ☐ Security System | Page Title: contains "rent" Page Title: contains "interest" Page Title: contains "security" | website  Google Analytics  CDP Insurance Demo eimdemo  https://cdp-ts.eimdemo.com |

FIG. 6L

SYSTEMS AND METHODS FOR AUDIENCE BASED DOCUMENT GENERATION AND COMMUNICATION TARGETING

TECHNICAL FIELD

This disclosure relates generally to the management, development, editing, deployment, and communication of content. More particularly, this disclosure relates to embodiments of systems and methods for audience based targeting of communications for delivery on a communication channel. Even more specifically, this disclosure relates to embodiments of systems and methods for the design and dynamic generation of audience targeted communications for multi-channel delivery.

BACKGROUND

Ever since the advent of computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore, results in an extremely complex web of interconnectivity involving hundreds or sometimes thousands of systems or people.

Oftentimes enterprises (e.g., almost any profit or non-profit entity such as a service company, an insurance or utility company or another type of entity) wish to communicate with their customers or other entities with whom they wish to engage (e.g., distributors, partners, regulatory bodies, donators, etc.) via multiple communications channels. As such, customer will be understood herein not in the commercial sense, but instead understood to mean an entity having (or having had) some interaction with an enterprise. Accordingly, while the types of content management systems discussed above are useful in creating, versioning and controlling access to content, they do not provide a convenient mechanism to integrate such content in outbound communications across multiple channels.

To address the need for multi-channel communication, an enterprise may integrate a customer communication management (CCM) system. CCM systems can provide an enterprise with an application to improve outbound communications with their customers (e.g., distributors, partners, regulatory bodies, individual users, or other entities). Such CCM systems may allow an enterprise to improve the creation, delivery, storage, or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, or mobile applications.

The correct targeting of such communications is, however, quite an important step in many enterprise customer communication processes. While CCM systems may provide improved control of outbound communications, they do not provide a straightforward ability to effectively target such communications.

SUMMARY

As previously discussed, current CCM systems do not provide effective targeting mechanisms for outbound communications. To illustrate, in many cases, a CCM system may be used to generate a document of the same basic type (e.g., based on the same document template) for multiple users and send an instance of the generated document as a communication to each individual user. Accordingly, it is often desired that CCM systems be able to "target" communications to users by sending a particular communication (e.g., a document of a particular type, version, format, including or excluding specific content, etc.) to a user based on characteristics or attributes (used herein interchangeably) of that user. In other words, to tailor generated documents in some manner based on an attribute of the user to which the document is to be sent as a communication. These attributes can include such things as demographic information of the user or the user's interests or specified characteristics.

Additionally, in many cases, CCM systems may facilitate not just a single communication, but an ongoing dialogue or conversation with a user comprising multiple related communications. Accordingly, not only is it desired to target individual communications to users based on the individual attributes of a user, but it is additionally desired to dynamically target related (or even unrelated) communications to users based on those users attributes.

Moreover, it may be desired to be able to target various aspects of those communications individually. Thus, for example, it may be desired send essentially the same communication (e.g., a bill or welcome letter, or invitation, registration confirmation, etc.) to different users and to include different content in each of those communications based on attributes of the user for which the communication is being generated.

Thus, CCM systems may allow a user (e.g., a designer) to define templates for rendering customer communications on one or more channels (e.g., email, SMS, web page, print, PDF). Templates may specify static content as well as the content that can change (or be included or excluded) based on a user. By specifying how the content may change and the associated user data, communications generated from such a template may be targeted to the user for whom the communication is being generated. The efficacy of the targeting of these communications is heavily dependent on the user data used to target these communications.

Often times enterprises utilizing CCM to target communications to users have a corresponding web site with which users may interact. It would thus be desirable to use the insights gleaned from users' interaction with web sites to target communications. Certain advanced tracking techniques and mechanisms for determining users' interests with respect to interaction with web sites and web content have recently been implemented. These techniques relate to the determination of segments or groups of users with specific interests, intents, or demographic information. These groups are sometimes referred to as "audiences".

Embodiments as disclosed may thus provide a way to design, deploy and utilize targeted communications based upon these audiences. More specifically, embodiments may allow the targeting of communications to users based on a user's audience affiliation and, in particular, may allow the dynamic targeting of communications based on an audience with which a user is affiliated.

In one embodiment, to facilitate audience targeted communication and the design of associated document templates, embodiments may employ a customer data engine. The customer data engine may maintain user profiles associated with the visitors to a (e.g., the enterprise's) web site. The customer data engine can also request audience data from an analytics platform. The customer data engine may thus maintain this audience data where the audience data includes audience data regarding audiences utilized, or otherwise associated with, an enterprise. The customer data engine can correlate the user profiles of users with such audiences.

Embodiments of a CCM system can accordingly include a document designer that interacts with the customer data engine to allow the creation of a document design including one or more document templates for the generation of communications to be targeted based on these audiences.

A communication can be generated for a user based on such a defined document template. To generate such a communication from the document template, the CCM system can obtain the attributes associated with the user from the customer data engine. The CCM can then evaluate the document template using the user's attributes to determine the content to be included in the communication generated for the user, including content to be included based on a user's affiliation (or lack of affiliation) with an audience. As a result, communications generated from the document template are targeted to the user based on the user's affiliation with particular audiences by including content specified in association with those audiences in communication generated from that template for the user. The generated communication may be delivered via a print channel, email channel, SMS channel, web page, or another electronic output channel.

As can be seen, embodiments may present a number of advantages with respect to tailoring of content and communications to users. As one particular advantage, embodiments may allow the tailoring of communications or content delivered on one communication channel to a user based on that user's activity and interests as expressed in another communication channel, even when this content tailoring is accomplished at a later point or according to a different time frame.

As an additional advantage, embodiments may serve to reconcile audience knowledge across different facets of an enterprise. In particular, users who design and implement communications for customers may not be the same members of the enterprise that define or interact with an analytics platform that tracks users of that enterprises websites and associates users of that website with audiences. Thus, these users designing such communications may, in some cases, not even be aware of the audiences being tracked by the enterprise (e.g., using an audience platform). However, as embodiments may provide a mechanism for a user to created variations of documents or associated content based on currently available audiences obtained from such an audience platform, these communication designers may indirectly be made aware of such audiences and may in fact, tailor the (design of) communications to such audience, despite their initial lack of awareness of these audiences.

In one embodiment, user specific communications may be generated based on audience affiliation, by obtaining a user profile comprising user data determined based on user interactions over a computer network and obtaining first audience data determined at an audience platform, where the audience data comprises a set of audiences associated with a set of audience attributes. This user profile can, for example, include user data provided by a user (e.g., when interacting with a web site). An event associated with a user may be received and a first communication template obtained. The first communication template is associated with a rule for content selection for communications generated from the communication template, wherein the rule defines first content and an associated audience. The user profile for the user is correlated with the first obtained audience data based on the audience attributes to determine the user is affiliated with the associated audience. A communication tailored to the user is generated based on the communication template and the determination that the user is affiliated with the associated audience of the rule, wherein the user tailored communication includes the first content associated with the rule. The communication is then sent to the user over a first communication channel.

In another embodiment, it is determined a second event associated with the user, has occurred wherein the second event occurs subsequently to the first event. Second audience data associated with the user determined at the audience platform can be obtained. A second communication template can then be obtained, wherein the second communication template is associated with a second rule for content selection for communications generated from the second communication template and the second rule defines second content and the associated audience. The user profile for the user can be correlated with the obtained second audience data based on the audience attributes to determine the user is no longer affiliated with the associated audience and a communication tailored to the user generated based on the communication template and the determination that the user is affiliated with the associated audience of the rule, wherein the user tailored communication excludes the second content defined by the rule. This communication can be sending the communication to the user over a second communication channel, which may be the same, or different, than the first communication channel.

In some cases, the first event or the second event can be an expiration of a time period or the second event can be an interaction with the first communication tailored to the user.

In some embodiments, message content design and generation may be done using an audience integrator by generating a message comprising a template, the template comprising predefined template content comprising an audience identifier to format the template content. The message can be deployed and a user identifier for a user consuming the message received. The user identifier may be sent to an audience integrator and, based on the user identifier, the audience identifier is received. A user interaction may be received based on the deployed template content in the message and the message regenerated where the regenerating occurs at least in part based on the received audience identifier and the user interaction. The regenerated message can be deployed.

In one embodiment, the template content comprises a plurality of components, at least one of the components formatted based on the audience identifier.

In another embodiment, the audience identifier comprises a plurality of unique audience identifiers and the audience integrator generates a plurality of audiences, each characterized by one of the unique audience identifiers, the plurality of audiences comprising audience parameters and the audience parameters are modified based at least in part on the user interaction. Such a user interaction may comprise a user behavior, the user behavior comprising selecting a message link, submitting form values, or inputting a command.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 6A-6L are examples of designer interfaces for designing document templates, or portions thereof, and communications generated from such document templates.

DETAILED DESCRIPTION

Figure 1:
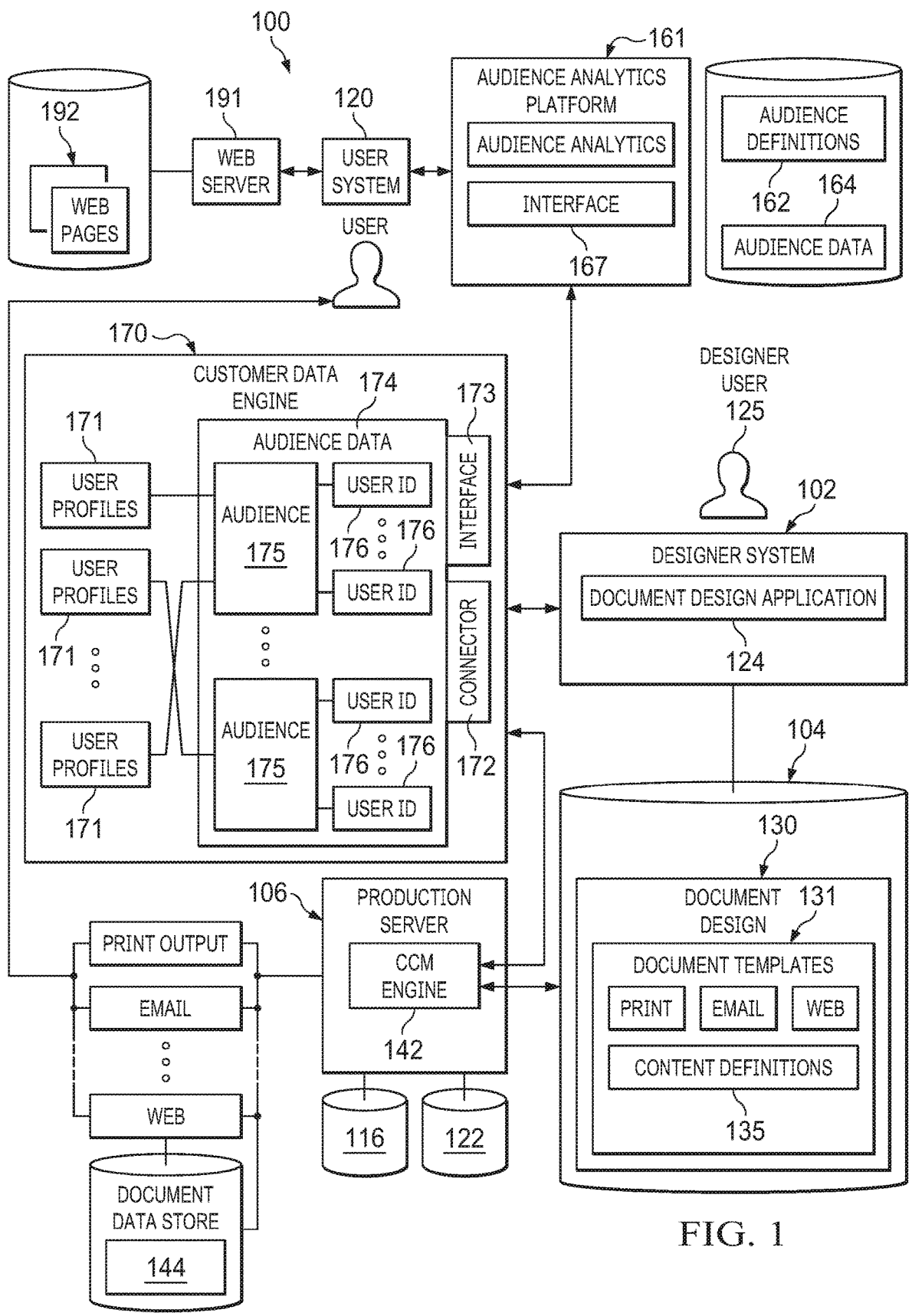
FIG. 1 is a diagrammatic representation of one embodiment of a computer implemented system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, to address the need for multi-channel communication, an enterprise may utilize a customer communication management (CCM) system. A CCM system may allow a user to define templates for rendering customer communications on one or more channels (e.g., email, SMS, web page, print, PDF). Templates may specify static content as well as the content that can change based on customer data or other data and how content behaves (e.g., reflows or otherwise behaves). Such templates may include variables and have associated logic. A CCM system may process a template to render customer communications from the template.

As mentioned, current CCM systems do not provide effective targeting mechanisms for outbound communications. To illustrate, in many cases, a CCM system may be used to generate a document of the same basic type (e.g., based on the same document template) for multiple users and send an instance of the generated document as a communication to each individual user.

Accordingly, it is often desired that CCM systems be able to "target" communications to users by sending a particular communication (e.g., a document of a particular type, version, format, including or excluding specific content, etc.) to a user based on characteristics or attributes (used herein interchangeably) of that user. In other words, to tailor generated documents in some manner based on an attribute of the user to which the document is to be sent as a communication.

These attributes can include such things as demographic information of the user or the user's interests or specified characteristics. Such interests, desires, or characteristics can be observed interests associated with the user that may be determined from, for example, a user's interaction with electronic content such as web pages, text messages, emails, etc., or a user's direct provisioning or specification of the user's information (e.g., in response to a request for such information through a communication or web page, etc.).

Additionally, in many cases, CCM systems may facilitate not just a single communication, but an ongoing dialogue or conversation with a user (e.g., multiple associated communications), whereby the CCM system may send a set of related communications to a user. When sending such related communications, the issuing of a subsequent communication may be driven by a number of criteria, including for example, the expiration of a time period, or an action (e.g., a user interaction) related to a previously sent communication. Each of the communications may include a document with less, additional, or different content than a previously sent communication, and the related communications may all be sent over the same communication channel, or may be sent over different communication channels. In such cases, a CCM system may maintain a state (e.g., related to an ongoing workflow, dialogue, or conversation, collectively communication workflow) associated with a user and that particular communication workflow. Thus, in many cases CCM systems may provide a wide variety of options with respect to the design of such communications.

Thus, not only is it desired to target individual communications to users based on the individual attributes of a user, but it is additionally desired to dynamically target related (or even unrelated) communications to users based on those users attributes, including attributes, interests or characteristics that may have changed (or been determined initially) between the time of sending one communication and the time of sending a subsequent communication. Moreover, it may be desired to be able to target various aspects of those communications individually. Thus, for example, it may be desired send essentially the same communication (e.g., a bill or welcome letter, or invitation) to different users and to include different content in each of those communications based on attributes of the user for which the communication is being generated.

To allow these types of capabilities, CCM systems may allow a user (e.g., a designer) to define templates for rendering customer communications on one or more channels (e.g., email, SMS, web page, print, PDF). Templates may specify static content as well as the content that can change (or be included or excluded) based on a user (e.g., the user for whom the communication is being generated) data or other data or how content behaves (e.g., reflows or otherwise behaves) based on user data. Such templates may include variables and have associated logic. A CCM system can thus process a template to render customer communications from the template. By specifying how the content may change and the associated user data, communications generated from such a template may be targeted to the user for whom the communication is being generated.

As may be realized, the efficacy of the targeting of these communications is heavily dependent on the user data used to target these communications. The more detailed the information that can be used in the design of such templates (and thus used in the generation of such communications), the better appropriate (and more effectively targeted) content can be selected for inclusion in resulting communications generated from such a template.

Often times enterprises utilizing CCM to target communications to users have a corresponding web site with which users may interact. In fact, it is often the case that the users to whom communications are being targeted by a CCM (e.g., in an orthogonal communication channel such as email, print, SMS, etc.) are the very same users who have visited (interacted with) that enterprises' web site. It would thus be desirable to use the insights gleaned from users' interaction with the enterprises' (or another) web site to target communications to those users (e.g., again on an orthogonal communication channel such as email, print, SMS, etc.).

While tracking of user activities on web sites can be accomplished, in many instances there are difficulties in using such tracking data for targeting communications in a CCM. Specifically, there are difficulties with associating the users tracking data with that users interests, and even more particularly, in associating users tracking data with respect to web site with content selection for a particular type of communication for a user based on a specific template. Part and parcel with these difficulties, users' interests change over time, it is likewise difficult to determine when users' interests have changed based on their web site interactions and utilize those changed interests to select alternative content (or include additional content or exclude certain content, etc.) for a targeted communication. This is especially the case when a communication workflow is being conducted with a user. If a user's interests have changed after a communication is sent to a user, it would be advantageous for the users' changed interest to be dynamically reflected in a subsequent communication sent to that user.

Certain advanced tracking techniques and mechanisms for determining users' interests with respect to interaction with web sites and web content have recently been implemented. These techniques relate to the determination of segments or groups of users with specific interests, intents, or demographic information. These groups are sometimes referred to as "audiences" and it is this terminology that will be utilized herein.

To implement this grouping of users of a web site a (e.g., web based) analytics platform may receive data pertaining to a user's interactions with a web site. The web site may, for example, have instrumented pages such that as a user interacts with the pages of a web site tracking data may be sent from the user's computer to the analytics platform. This tracking data may include a user's interactions with the pages of the web site or other data, including tags or other information associated with the web pages with which the user is interacting, or client identifiers or the like utilized by providers of the pages of the web site (e.g., and stored in cookies at the user's device). Alternatively, such user tracking data may be received at the analytics platform from other sources. Based on the web site tracking data associated with the user the user may be associated with one or more audiences by the analytics platform.

While analytics platforms may associate users with audiences that are generally defined by the analytics platform, such a based on demographic information (e.g., location, age, gender, life events, etc.), to improve the usefulness of audience assignments, an analytics platform may also allow users (e.g., administrative users or otherwise) associated with the web site (e.g., of an enterprise) to define audiences of specific interest. Thus, the analytics platform may allow a user associated with a web site to define audiences specific to that web site, or provider of that web site, such as audiences related to people who express an interest in certain portions or pages of a web site, users who showed similar interests to other users of the web site, interacted with web pages having certain associated tags (e.g., keywords), users who access certain URLs, users who searched for, or otherwise entered, certain terms (e.g., keywords), users who accessed certain documents of videos, etc. In this manner, users can be associated with an audience that narrowly (and broadly) define users' interest at a low level of granularity.

Embodiments as disclosed may thus provide a way to design, deploy and utilize targeted communications based upon these audiences. More specifically, embodiments may allow the targeting of communications to users based on a user's audience affiliation and, in particular, may allow the dynamic targeting of communications based on an audience with which a user is affiliated. As but one example, embodiments may allow the targeting of communications based on users' associated audiences as determined from that users interactions with a website, and the designing of document templates for the generation of such targeted communications.

Referring then to FIG. 1, one embodiment of a computer implemented system 100 is depicted. System 100 includes an enterprise CCM environment that comprises a designer system 102, a design data store 104, a production server 106, a document store 108, and an enterprise data source 116.

System 100 further includes a user system 120 and an external data source 122.

Enterprise data source 116 may comprise a plurality of data sources including, but not limited to, digital asset management (DAM) systems, content management systems (CMS), web content management (WCM) systems, enterprise content management (ECM) systems, or other data source. Similarly, external data source 122 may comprise a plurality of external data sources. System 100 may be a distributed, networked computing environment comprising a plurality of computing system or applications coupled through a network. The network may be the Internet, an intranet, a wireless or wired network, a local access network (LAN), a wide access network (WAN), a cellular network or some combination of these types of networks, or another type or types of networks.

The enterprise CCM environment implements a design environment that allows designers to create document designs that can be manifested across multiple channels. To this end, the enterprise CCM environment includes a designer system 102 that runs a design application 124 to provide the design environment in which designers (e.g., designer 125) can create document designs. The document design application 124 may be, for example, a resident application at the designer system 102, such as a desktop application, or may be a web-based application. According to one embodiment, design application 124 provides an object-oriented design environment in which components of a design are represented by objects. Document designs created by design application 124, such as document design 130, may be stored to a design data store 104.

In a design phase, a designer 125 (e.g., users at an enterprise) may create various document templates, such as document template 131. A document template 131 can include a number of assets (e.g., other content items, including other templates), where each of these content items may be from one or more other distributed network locations such as a DAM system, WCM system or ECM system within that enterprise. A CCM system may use the document template to generate a communication for a user associated with the enterprise (e.g., a customer, an agent) and deliver that communication in a format and through a communication channel associated with that user (e.g., as determined from a user or customer database). It is common for enterprises to have hundreds of thousands of document templates for use in their CCMs, where these templates can generate millions of communications per month or more.

The design application 124 may thus present the user with a graphical (or other) interface at the user's computing device (e.g., designer system 102) to allow the user to design and select content items in content management systems for inclusion in a created document template 131 and to specify which areas of the document template may accept content or where content may otherwise be changed, added, removed, or edited. The design application 124 may also allow the designed document template to be saved in a content management system of the enterprise such that the template may be managed as content of the enterprise.

The design phase, according to one embodiment, is not merely an edit phase, but is an application type development environment where document designs are created as document templates. Design 130 may include all of the design objects and their property settings that make up a statement, letter, invoice, bill, or other customer communication. In some embodiments, design 130 sets a framework of how objects and portions of documents generated from design 130 are presented as well as the rules governing that presentation, thus setting the overall appearance of communications to end-users. Design 130 may also define the data sources available and the rules governing their selection, as well as the access and authentication regarding user ability to change certain content elements and access to any or all available data sources.

Design 130 provides an abstract description for how end-user communications should appear. Design 130 describes the overall layout of the communications and determine which parts of an end-user communication will contain static information, such as standardized text, which parts of the end-user communication will be filled according to rules. Design 130 can specify editable and viewable text, optional and selectable paragraphs, variables, values for variables or text areas, sources for content (e.g., values of variables, text for text areas, images), rules for populating content, resource rights, and user rights, among others.

Design 130 can comprise document templates for multiple forms of customer communication across various channels (e.g., templates for print, web, email, interactive document, or other channels). A single document design 130 may include any number of document templates. For example, an enterprise may have hundreds of correspondence letter templates and a single document design 130 can contain all of these templates.

A document template (e.g., document template 131) may be used to generate customer communications having one or more pages. To this end, a document template may include a definition 135 for content to be included in portions of a generated document or may include one or more related templates (e.g., page templates) for email, print, customer-facing web pages, interactive document pages or other output, where these templates specify the content, layout and formatting an end-user sees in a customer communication. A page template can specify editable and viewable text for a page, optional and selectable paragraphs for the page, variables, values for variables or text areas of the page, sources for content of the page, rules for populating content of the page, resource rights for the page, and user rights for the page, among others. A page template can thus specify the overall layout of an individual page, which parts of the page will contain static information, which parts will be filled according to rules, and how content on a page behaves (e.g., reflows or otherwise behaves). A page template for an interactive document may further specify which portions of the page are editable by an editor-user.

Page templates can reference associated styles, logic, variables, or other objects. For example, a page template may reference a style sheet. While a single design 130 may contain many templates and styles, a design 130 may also contain relatively few templates and styles (e.g., a single page template) with zero or more styles. The content and layout specified by design 130 may be in accordance with specifications provided by the enterprise.

As discussed, embodiments may allow the targeting of communications generated from these document templates 130 to users based on a user's audience affiliation and, in particular, may allow the dynamic targeting of communications based on users' interactions with a web site, and the designing of document templates for the generation of such targeted communications.

To elaborate in more detail, in many cases an enterprise may provide a web site (e.g., a location on the Internet or an intranet) that users may access using, for example, a browser application on the user's computing device or the like. Such a web site may be provided by a web server 191 which provides access to the web pages of the web site 192. Thus, in association with the web server 191 serving web pages of the enterprise's web site 192 to a user (at the user's system 120), the user may be associated with an identifier (a client ID) for that user. That identifier may, for example, be stored in a cookie at the user's device 120 by the web server 191 such that the client identifier may be communicated from the user system 120 in association with requests for web pages originating from the user's system 120. In this manner, a user profile associated with the user and the client ID associated with the user can be maintained.

In one embodiment, to facilitate audience targeted communication and the design of associated document templates, embodiments may employ a customer data engine or platform (used here interchangeably) 170. This customer data engine 170 may, for example, include one or more cloud deployed instances of such a customer data engine 170, may be server deployed on premise of an enterprise of may be deployed in an alternate configuration.

Customer data engine 170 may maintain user profiles 171 associated with visitors to a (e.g., the enterprise's) web site. This user profile 171 may include the identifier for a user (e.g. the client ID, some combination of identifiers, etc.) provided in association with the provisioning of the web site to the user. The user profile 171 may also include other data associated with the user, including a browser identifier associated with a browser on the user's device 120 or data provided by the user as they accessed the web site 192 of the enterprise. This user data may include demographic data about a user, including the user's email or phone number or address. For example, when a user interacts with a web site 192 (e.g., to register for an event, institute a communication such an insurance quote, etc.) this user data may be stored in the maintained user profile 171.

As noted, an analytics platform 161 (also referred to herein as an audience platform) may allow a user associated with an enterprise to define audiences specific to a web site for that enterprise, such as audiences related to users who interacted with or otherwise indicated an interest in certain portions, pages, or content of a web site 192. The analytics platform 161 may also include other definitions for audiences provided by other sources, including those defined by operators of analytics platform 161. These audience definitions 162 are stored and maintained by the analytics platform 161.

Thus, as a user accesses the web site 192, the analytics platform 161 may receive data pertaining to a user's interactions with a web site 192. The web site 192 may, for example, have instrumented pages such that as a user interacts with the pages of a web site 192, tracking data may be sent from the user's computer 120 to the analytics platform 161.

This tracking data may include a user's interactions with the pages of the web site 192 or other data, including tags or other information associated with the web pages with which the user is interacting, or client identifiers or the like utilized by providers of the pages of the web site (e.g., and stored in cookies at the user's device 120) or other identifying information such as a browser identifier associated with the user's browser. Alternatively, such user tracking data may be received at the analytics platform 161 from other sources. Based on the web site tracking data associated with the user, the analytics platform 161 may utilize audience analytics to associate the user with one or more audiences. The analytics platform 161 stores this audience data 164 associating users with the audiences defined by the audience definitions 162.

In some embodiments, then, the customer data engine 170 can utilize a connector 172 adapted to request audience data 164 from an analytics platform 161. The analytics platform 161 may provide an interface 167 such as a RESTful web services interface or the like through which audience data 164 may be obtained. The customer data engine 170 can utilize the connector 172 to send a request through the interface 167 provided by an analytics platform 161 wherein the request requests audience data 164 and identifies, for example, the enterprise (e.g., associated with the web site 192).

In response, the analytics platform 161 may return audience data 164 (e.g., associated with the identified enterprise), including audience attributes such as identifiers for the audiences associated with the enterprise (e.g., the GUIDs or tags), and identifying information for users of the enterprises' web site that have been associated with those audiences. The identifying information for those users can, for example, be the client IDs assigned by the enterprise (e.g., through web server) in association with that user visiting the web site.

The customer data engine 170 may thus maintain audience data 174 where the audience data includes audience data regarding audiences 175 utilized, or otherwise associated with, an enterprise, and may include a set of audience identifiers for audiences 175 utilized by the enterprise. These audience identifiers may include unique alphanumerical identifiers (e.g., a globally unique identifier (GUID) or the like) for the audiences or may include a human readable or assigned tag for an audience, such as a label specified by a user who defined the audience at analytics platform.

The audience data 174 may also include user identifiers 176 (e.g., client IDs) of users (e.g., visitors to the enterprise's web site) that have been associated with that audience 175 by the analytics platform. By repeatedly (e.g., at some time interval that may be configurable or regular) sending a request for such audience data 174 from the customer data engine 170 to the analytics platform 161, the audience data 174 maintained at the customer data engine 170 may be kept substantially up to date.

Additionally, customer data engine 170 may correlate the user profiles 171 associated with visitors to a (e.g., the enterprise's) web site with the audience data 174. As discussed, a user profile 171 may include the identifier for a user (e.g. the client ID) provided in association with the provisioning of the web site to the user or a user's browser identifier, etc. Such an identifier for a user as included in the user profile 171 (e.g., a client ID, browser identifier, etc.) may thus be correlated with the user identifiers 176 of the audience data 174 to associate the user profiles 171 of web site visitors with the audiences 175 such that user profiles 171 of web site visitors (including user profiles 171 for those that provided information through the web site 192) are associated with audiences 175 (e.g., reflecting that user's interests).

Embodiments of a CCM system can accordingly include a document designer application 124 which allows the creation of a document design 130 including one or more document templates 131 for the generation of communications to be targeted based on these audiences. The designer application 124 may thus present a user with a graphical (or other) interface at a computing device (e.g., designer system 102) to allow the user to define a document template 131 where portions of the document template 131 may define content (e.g. in content definitions 135) to be included in a document generated from the template based on an audience associated with a user for whom the communication is being generated.

Figure 2:
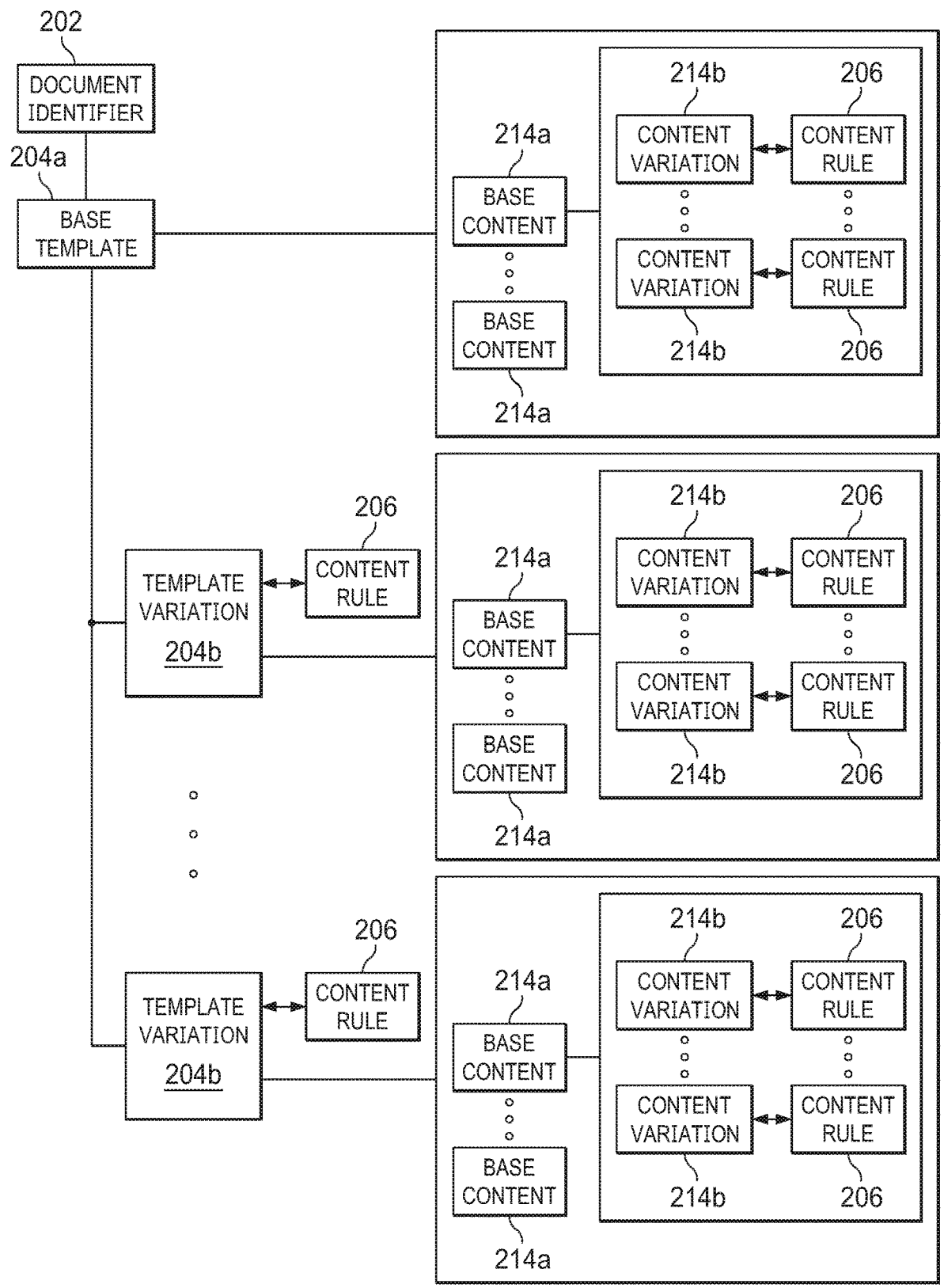
FIG. 2 is a diagrammatic representation of one embodiment of the structure of a document template.

Before delving into more detail regarding the use of such a design application, it may be useful to discuss embodiments of document templates in more detail. Moving then to FIG. 2 depicting the structure of one embodiment of a document template. As discussed, a document template may be used to generate documents that have one or more pages that may be sent as customer communications. A document template thus specifies the content that will be included a communication (e.g., a document to be sent via a communication channel) generated from the document template. In certain embodiments, a document template can define an overall layout of an individual document, which parts of the document will contain static information, which parts of document will be populated according to rules, how content on a page behaves (e.g., reflows or otherwise behaves), etc.

A document template and content within the document template may be associated with content variations whereby base content (e.g., such as an entire template, an image or text, etc.) may be defined for that portion of the document template. Additionally, one or more (content) variations of the content for any portion of the document defined by the document template may also be associated with that portion of the document. Such a content variation may specify associated content (that may vary from the base content) and a content rule. A content rule may specify a value for one or more attributes (such as attributes of a user for whom the document is to be communicated) or a condition for that attribute related to the value, such that if the condition or value for the attribute specified by the content rule is met when generating a document from that document template, the content of the variation will be included in the generated document (e.g., in place of the base content).

Thus, a document template is associated with a document identifier 202 for that document template. The document identifier 202 is, in turn, associated with the base document template 204a. There may also be zero or more defined document template variations 204b for that document template (i.e., a template variation is a content variation of the base document template 204a). Each template variation 204b may be a document template that is different than the base document template 204a. Moreover, each template variation 204b is associated with a content rule 206 that specifies a value for one or more attributes or a condition for that attribute related to the value, such that if the specified condition or value for the attribute by that content rule 206 is met when generating a document from the document template associated with document identifier 202, the template variation 204b associated with that content rule 206 will be used to generate the document (e.g., in place of the base document template 204a).

Similarly, for other portions 214 of each document template 204, base content 214a (e.g., such an image or text, etc.) may be associated with that portion of a document template. Additionally, zero or more (content) variations 214b of the base content 214a for that portion of the document may also be associated with that portion of the document template 204. Such a variation 214b may specify associated content (that may vary from the base content 214a) and a content rule 206. Again, content rule 206 specifies a value for one or more attributes or a condition for that attribute related to the value, such that if the specified condition or value for the attribute by that content rule 206 is met when generating a document from the associated document template 204, the content variation 214b associated with that content rule 206 will be used to generate the document (e.g., in place of the base content 214a).

It will be understood that these content variations may be at almost level of granularity desired (i.e., the portion of the template for which a content variation is defined may be the entire template or some smaller portion, including individual words or sections of text or images or graphics of the document template). For example, at a high level of granularity, a user may specify a base document template and one or more content variations corresponding to the document template (referred to as a document template variation), whereby these document template variations may be selected based on the values of the attribute or conditions of the content rule associated with each template variation. As another example, at a lower level of granularity, a user may specify base content associated with an image and one or more content variations corresponding to that base image content, whereby these content variations may be selected based on the values of the attribute or conditions of the content rule associated with each content variation. As still another example of the use of content variations, at an even lower level of granularity a user may specify base content associated with a segment of text (e.g., even down to the word or phrase level) and one or more one or more content variations corresponding to that text content, whereby these content variations may be selected based on the values of the attribute or conditions of the content rule associated with those content variations. It will be noted here as well that while the base content may be a particular type of content (e.g., an image, text, video, etc.), content associated with a content variation for that base content may be a completely different type of content (e.g., text, video, etc.).

Moreover, it will be observed that while these content variations have been described with respect to base content and content variations, it may be the case that in certain document templates no base content may be specified for a document portion, and instead the portion of the document template may be associated with one or more content variations, such that a content variation may be included in a generated document if an associated content rule is met (or alternatively, if no content variation is selected no content may be selected for inclusion in a document generated from the content template).

From a review of the above, it will be noted then that different documents (to be sent as communications) may be generated from the same document template based on these content variations 204b, 214b. To illustrate, when a communication is to be generated for a user, the document identifier 202 of the document template 204 to be utilized to generate that communication (e.g., the document to be sent as a communication to the user) may be determined or otherwise obtained. Data associated with the user, such as values for particular attributes of that user, may also be obtained. When generating the document from the document template 204 then, the content rules 206 associated with the content variations 204b, 214b defined in in the document template may be evaluated based on the values of the attributes associated with that user, and based on this evaluation of the content rules 206 for the content variations 204b, 214b, particular content variations 204b, 214b (or base content 204a, 214a) can be selected for inclusion (or exclusion, etc.) in that portion of the generated document for communication to that user. Conversely, other users not having that same attribute may receive base content 204a, 214b (or another content variation 204b, 214b) in a communication generated from that same template for those users. In this manner, as a document is generated from the document template 204 for a particular user, the document generated for communication to the user can be tailored to that user based on that user's attributes.

Returning to FIG. 1, embodiments as disclosed may thus utilize such content rules to design, deploy and utilize targeted communications based upon audiences. In particular, embodiments may allow the use of content rules that specify a (e.g., type or designation of an) audience as an attribute of the content rule such that if a user is (or is not) associated with that audience (e.g., indicated as a member of, or otherwise affiliated with, that audience), the associated content will (or will not) be included in a document generated from that document template and intended to be communicated to that user.

To facilitate the use of audience based content rules in the design of document templates, document design application 124 may provide an interface that allows a user (e.g., a designer 125) to designate content rules with respect to a particular portion of a document template 131. As a user (e.g., designer 125) is defining content to be included in a document template 131, including base content or any content variations and their associated content rules, the designer application 124 may provide an interface to allow a user deigning the document template 131 to specify a content rule based on an audience.

In particular, in embodiments the designer application 124 may access the customer data engine 170 through an interface 173 provided by the customer data engine 170 to request the set of audiences 175 maintained by the customer data engine. The customer data engine 170 can respond to such a request by returning the audiences 175 (e.g., identifiers for those audiences 175) to the designer application 124. The designer application 124 then presents the set of obtained audiences 175 utilized by the enterprise (e.g., and stored at the customer data engine 170) to a user 125 designing the document template 131.

The user 125 can select one or more of these audiences 175 to be included in a content rule when defining a content variation for a document template 131. As discussed above, such a content rule for a content variation may specify, for example, that the content of the content variation is to be included in a document generated from the document template 131 when the user is (or is not) a member of a specified audience. In other words, communications generated from the document template 131 may be targeted to (users who belong to) certain audiences by including particular content when generating communications for users who are affiliated with such audiences.

As the designer application 124 may access the customer data engine 170 at design time (e.g., as the user accesses the document design application 124), and may access the customer data engine 170 repeatedly when content variations are specified), and the customer data engine 170 repeatedly updates its audience data 174 from the audience platform 161, only current audiences defined or utilized for a web site 192 or enterprise may be presented for use in designing such document templates 131 and deprecated audiences 175 may naturally get phased out use in the design of such document templates 131.

For example, when a communication is generated for a user from a document template 131 at a first time the audience affiliations of that user can be obtained at that time and used in the generation of the communication for that user. Subsequently (e.g., at a later time) when another communication is generated for a user from a document template (e.g., the same or a different document template) the audience affiliations of that user can be obtained at that second time and used in the generation of the communication for that user. If the users audience affiliations have changed between the first time and the second time, these changes in the audience affiliation may be reflected in the content included in the communication generated at the second time if warranted. When the user finishes designing the document template the document template that is saved includes any content variations, including those content variations that include content rules based on those audiences.

At some point then, it may be desired to generate a communication for a user based on such a defined document template 131. In some embodiments, then, this may entail the deployment of the document template 131 into a "production" environment (e.g., designating that the document template 131 may actually be used to generate communications to users). To this end, production server 106 provides a CCM engine 142 that processes the document's abstract design description (design 130 including the document template 131) and produces a document 144.

In such cases, CCM engine 142 of the production server 106 may receive an event such as a request to generate a communication for a user, where the request may include an identifier of the document template 131 to be used to generate the communication to the user along with an identifier for the user (e.g., a client ID for the user). Such a request may, for example, be initiated by a workflow engine or other application adapted to cause communications to users to be generated.

Specifically, CCM engine 142 may evaluate the design 130 to determine the content referenced by the document template 131, retrieve the referenced content from enterprise data source 116, external data sources 122 or other data source and render this content into document 144 as defined by document template 131.

Processing of document template 131 can include for example pulling sourced data into document 144. Sourced data can be pulled into the document 144 through network connections to enterprise data source 116, external data source 122, or other information sources. Of course, it should be understood that the data, whether from enterprise data source 116, external data source 122, or from another data source, could be content such as text, graphics, controls or sounds. It should be noted that many data sources can supply data input to the document 144.

To process such a document template 131 to determine what content to include in the document 144 based on the document template 131, CCM engine 142 can obtain the attributes associated with the identified user from the customer data engine 170 or such attributes associated with the identified user may be included in the request to generate the communication for the user. In one embodiment, the CCM engine 142 may send a request to the customer data engine 170 identifying the user (e.g., using the identifier for the user as received in the request to generate the communication) for whom the communication is being generated.

The customer data engine 170 can receive such a request identifying the user and obtain user data regarding the identified user. In one embodiment, the customer data engine 170 may utilize the identifier for the user as received in the request to determine the user data for the user. Specifically, the customer data engine 170 may utilize the user identifier to determine an user data from a user profile 171 associated with the user identifier and audiences 175 associated with the received user identifier based on the user data of the user profile 171 and the user identifiers 176 associated with the audiences 175 and any correlations between the user profile 171 for the user and the audiences 175.

Thus, user data may be returned from the customer data engine to the CCM engine 142. This user data may include user data as included in the user profile 171.

Additionally, as part of that user data, attributes associated with the user, including attributes indicating the audiences 175 with which that user is associated may be provided from the customer data engine 170 to the CCM engine 142. The CCM engine 142 can then evaluate the document template 131 using the user's attributes to determine the content to be included in the document 144 generated for the user based on the content variations and content rules specified in that document template 131.

In particular, for each portion of the document template 131 for which content is defined, the CCM engine 142 may determine any content variations whose content rule specifies an audience, and determine if the user for whom the communication is being generated is (or is not) a member of that audience based on the audience data for the user obtained from the customer data engine 170. The content of the associated content variations for which the user is (or is not) affiliated with the audience specified by the content rule of that variation may be included (or excluded) from the document 144 generated from that document template. As a result, documents 144 generated from the document template 131 are targeted to the user based on the user's affiliation with particular audiences 175 by including content specified in association with those audiences 175 in communications generated from that template 131 for the user. The generated document 144 may be sent as a communication to the user via a print channel, email channel, SMS channel, web page, or another electronic output channel.

To generate such a communication the CCM engine 142 may process document 144 to render document 144 to one or more of a variety of supported formats (e.g., email output, print output, web page output or other output) based on the document design 130 or document template 131. For example, CCM engine 142 can may render a mortgage statement document into an AFP format which can be immediately printed and mailed to the end user, an email that can be immediately emailed to the end user and an HTML file that can be stored as web content so that the end user can access their statement on the enterprise's website. Other output formats may also be supported.

As the customer data engine 170 regularly updates the audience data stored therein (e.g., by regularly sending requests for such audience data from the customer data engine 170 to the analytics platform 161), communications to users may be dynamically tailored to those users interests (e.g., as reflected by their audience affiliation) by generating communications that reflect the users' interests substantially at the time those communications are generated for the users. For example, when a communication is generated for a user from a document template 131 at a first time the audience affiliations of that user can be obtained at that time and used in the generation of the communication for that user. Subsequently (e.g., at a later time) when another communication is generated for a user from a document template 131 (e.g., the same or a different document template 131) the audience affiliations of that user can be obtained at that second time and used in the generation of the communication for that user. If the users audience affiliations have changed between the first time and the second time, these changes in the audience affiliation may be reflected in the content included in the communication generated at the second time if warranted.

Figure 3:
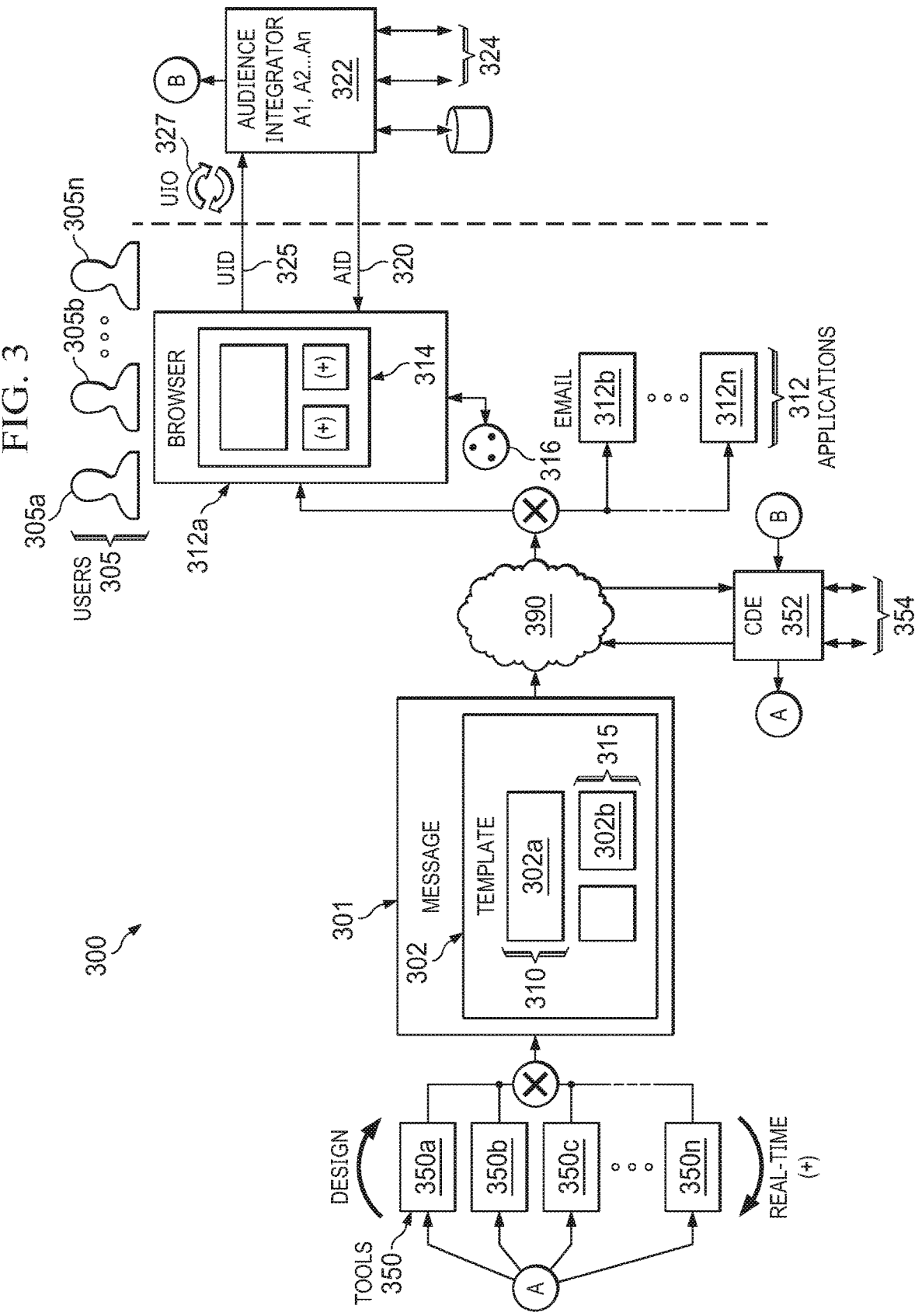
FIG. 3 is a diagrammatic representation of one embodiment of a computer implemented system.

Certain embodiments may be better understood with reference now to FIG. 3. Referring now to FIG. 3, in some embodiments, a system 300 generates a message 301 that includes a template 302 having predefined template content (302a, 302b, etc.). The message 301 references an audience identifier variable (AID) (designated in FIG. 3 as reference numeral 320) to format the template 302 and, when the message 301 is deployed, a user identifier UID (designated in FIG. 3 as reference numeral 325) for a user 305 (which may comprise users 305a, 305b . . . 305n) consuming the message 301 is received. The user identifier 325 is sent to an audience integrator 322 that identifies an audience (in FIG. 3, designated as one of A1, A2 . . . An) for the user 305 and, in turn, an audience identifier 320 for the audience is returned to format the message 301. The message 301 may be one of a variety of messages in different formats for a message context. In nonlimiting embodiments, the message 301 is a browser page, an email message, etc. Moreover, the message 301 may be deployed in different applications 312 (an examples of which are designated by reference numerals 312a, 312b . . . 312n) for consuming the message 301, such as a browser 312a, an email program 312b, etc.

The user identifier 325, in some embodiments, uniquely identifies a user 305 who consumes the message 301 in the message context. For example, the user identifier 325 may be that of a user/consumer who views/consumes the message 301 forming all or portion of a browser page 314 in a browser 312a. As will be appreciated by one of ordinary skill in the art, there are multiple methods to generate the unique user identifier 325. In a browser, for example, a unique cookie 316 may be generated and stored when a user 305 first visits website, and which the browser 312a uses to recognize when the user 305 revisits the website. The cookie 316 may then be used to generate a unique user identifier 325 to send to the audience integrator 322.

The user identifier 325 is sent to an audience integrator 322, which, upon receipt, the audience integrator 322 uses to reference the user 305 consuming the message 301. One of ordinary skill in the art will understand that a variety of audience integrator services exist that may be leveraged, but not part of the inventive subject, in external systems and services. Based on the received user identifier 325, the audience integrator 322 determines an audience identifier 320 for the user 305 and sends the audience identifier 320 to the message application to format all or a portion of the message for display in the message application (such formatted content generally designated by the (+) symbol in FIG. 3).

Furthermore, at least one user interaction UIO (designated by reference numeral 327) is received in the message application based on the user behavior/interaction with the deployed template content 302 in the message 301. The user interaction 327 can assume many forms, based primarily on the message context and the message application 312. For example, in embodiments for which the message 301 is associated with a web page 314 displayed in a browser 312a, the user interaction 327 can include, but is not limited to, a user selected link, a user submitted web form, a user button press, etc. In embodiments involving an email displayed in an email program 312b, the user interaction 327 can include, but is not limited to, a user selected link, a user command such as to forward the email, store the email, delete the email, etc.

As will be further explained below, in some embodiments, the audience identifier 320 and the user interaction 327 (as well as the user identifier 325) are used to regenerate the message 301, which is redeployed. In this way, the message 301 may be initially formatted, and then associated with a particular user and a particular audience which includes the user 305. The user 305 views and interacts with the message content 302a, 302b, and further based on the audience identifier 320, user identifier 325, and interaction(s) 327, the message 301 is regenerated and redeployed to target the user/audience (and in response to the captured user behavior).

In a further embodiment, the template content 302 includes multiple (e.g., content) components (302a, 302b), a portion or all of which are formatted based on the audience identifier 320. For example, the audience identifier 320 may assign the user 305 to a particular audience based on the user's age, gender, zip code, income, interests, and hobbies, etc. In this example, the user 305 may be a Jeep enthusiast who lives in Montana and enjoys off-roading. The set of user attributes help classify the user 305 as a member of a particular audience for off-road enthusiasts. The template content 302 is formatted for off-road enthusiasts audience, such as to present the user with a particular set of corresponding off-road enthusiast links. Upon selecting one of the links (characterized as a user interaction/behavior), the template content 302 is reformatted and regenerated and presented to the user 305. For example, the user 305 may click on a link for off-road, all-weather tires appropriate for the Montana winters and, in response, a portion of the template content (designated by reference numeral 315) is reformatted to include information for these tires, while another portion of the template content (designated by reference numeral 310) remains static to the original message design.

The audience identifier 320 may be one of a group of audience identifiers which identify a variety of audiences (A1, A2 . . . An). It should be noted that the audiences may be predefined, such as for a particular marketing campaign. Here, the user identifier 325, other user parameters and environmental parameters may be forwarded to the audience integrator 322, such that the audience integrator 322 can determine which audience (A1, A2 . . . An) the user 305 belongs to. In still other embodiments, the audience integrator 322 receives the user 305 and environmental parameters and generates audiences (A1, A2 . . . An). So, for multiple users (305*a*, 305*b* . . . 305*n*) and multiple user interactions 327, the information for which the audience integrator 322 receives is leveraged to build, modify, and extend audiences (A1, A2 . . . An), thereby providing a more dynamic set of audiences to generate far more responsive and appropriately targeted messages in real-time.

In some embodiments, a chief advantage of embodiments, is not only the ability to design preexisting messages 301 (and the template content 302*a*, 302*b* therein) but also the ability to redesign and redeploy these messages 301 based on dynamic, ever-changing audience information and real-time user interactions and behavior. The redesigned messages 301 will typically be far more responsive and engaging than static messages built solely at design time.

In still further embodiments, message generation tools 350 (designated in FIG. 3 by tools 350*a*, 350*b* . . . 350*n*) may be enabled to design these messages and programmatically regenerate the messages using real-time inputs (such real-time inputs generally designated by circle A in FIG. 3), thereby significantly expanding the capabilities and effectiveness of the message generation tools 350 and marketing campaigns. The message generation tools 350 may include web production tools which may be used to create web pages and components therein to reactively respond to detected audiences and real-time user behaviors. These web pages may be initially deployed with a preexisting format at design time with detailed in-place code to detect and set forth content upon further real-time inputs. Such real-time inputs include audience information and behaviors gathered at run-time and referenced in the code to regenerate template content. Similarly, communication message tools may be used to deploy communications and regenerate the communications to target audiences and campaigns more effectively and responsively. Other tools which may benefit from the inventive subject matter herein include collaboration tools, which may shift to different modes of collaboration and add appropriate content, and testing tools which can test the advocacy of marketing campaigns, communication workflows, etc.

In still further embodiments, a customer data engine (CDE) 352 is employed to help unify the message generation tools 350 and information shared therewith. It is foreseen that the CDE 352 is coupled to the message generation tools, via a network 390, such as an enterprise's intranet or the Internet, to feed user/customer data known to the enterprise to consume messages 301 (as is also designated by circle A in FIG. 3). Furthermore, (as is designated by circle B in FIG. 3) CDE 352 may also receive audience information from audience integrator 322. It is helpful to note that audience integrator 322 may leverage other external services (generally designated by reference numeral 324), such as data warehouses, machine learning and artificial intelligence platforms, to help build and modify audiences. The CDE 352 may also incorporate enterprise services (generally designated by reference numeral 354) shared across the enterprise ecosystem for machine learning, supporting cloud services, customer vocal input and processing, and internal audience tools.

Figure 4:
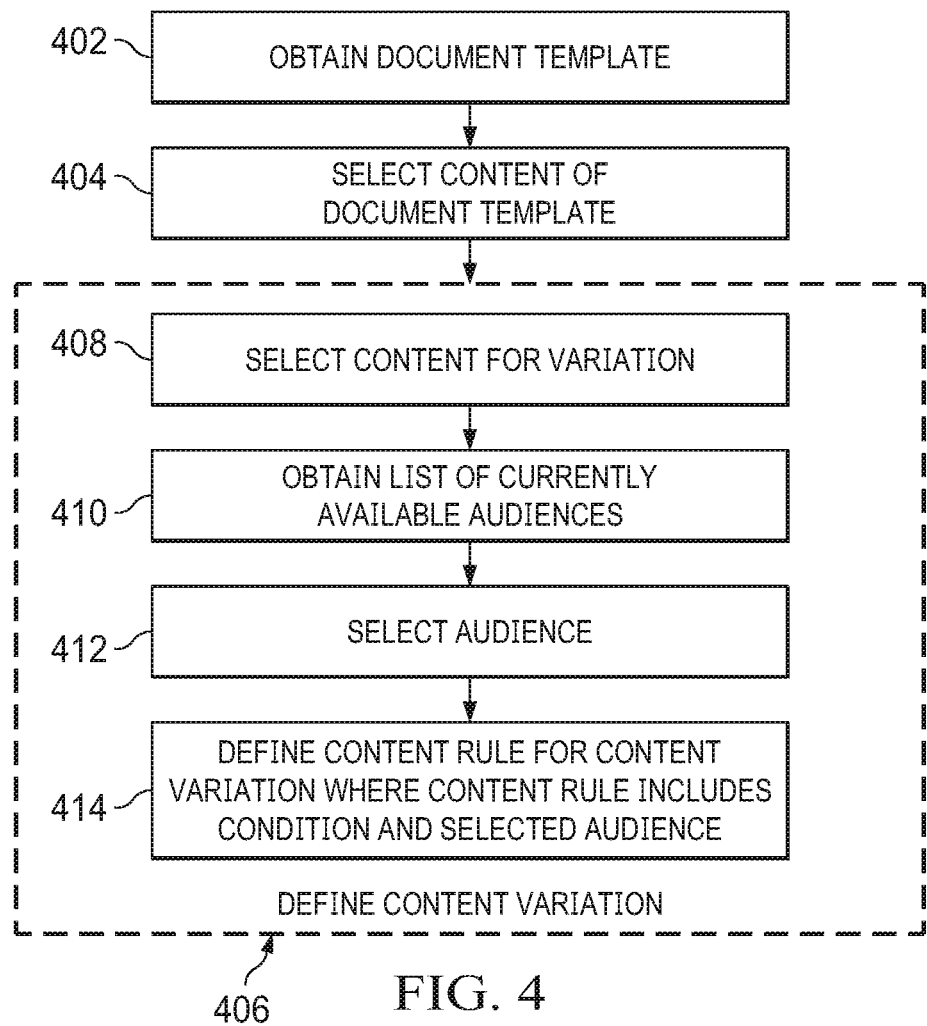
FIG. 4 is a flow diagram of one embodiment of a method for generating a document template for audience targeted communication.

FIG. 4 is a flowchart illustrating one embodiment of a method for designing audience targeted documents and communications. Initially, a document template may be obtained (STEP 402). This document template may be an existing document template or a user may indicate that a new document template is to be started. Once the document template is obtained the content of the document template may be defined (STEP 404). This document template may thus define content associated with portions of a document template.

One or more content variations for a portion of the document template can then be defined (STEP 406). For each portion of the document template then, a portion of the document (or content associated with that portion) may be selected for a content variation associated with an audience (STEP 408). To define such a content variation for a portion of the document, a currently available set of audience may be obtained (STEP 410). This set of audiences may be, for example, a set of audiences defined in association with a particular web site or otherwise defined. One or more audiences is selected for the content variation (STEP 412) and a content rule for the content variation may be defined based on the selected audience (STEP 414). The content rule may include one or more conditions to be evaluated in association with the selected audience (an attribute of the condition rule) such that if the condition is met (or not met) that content variation (e.g., the associated content) may (or may not be) included in a document generated from the document template being defined.

Figure 5:
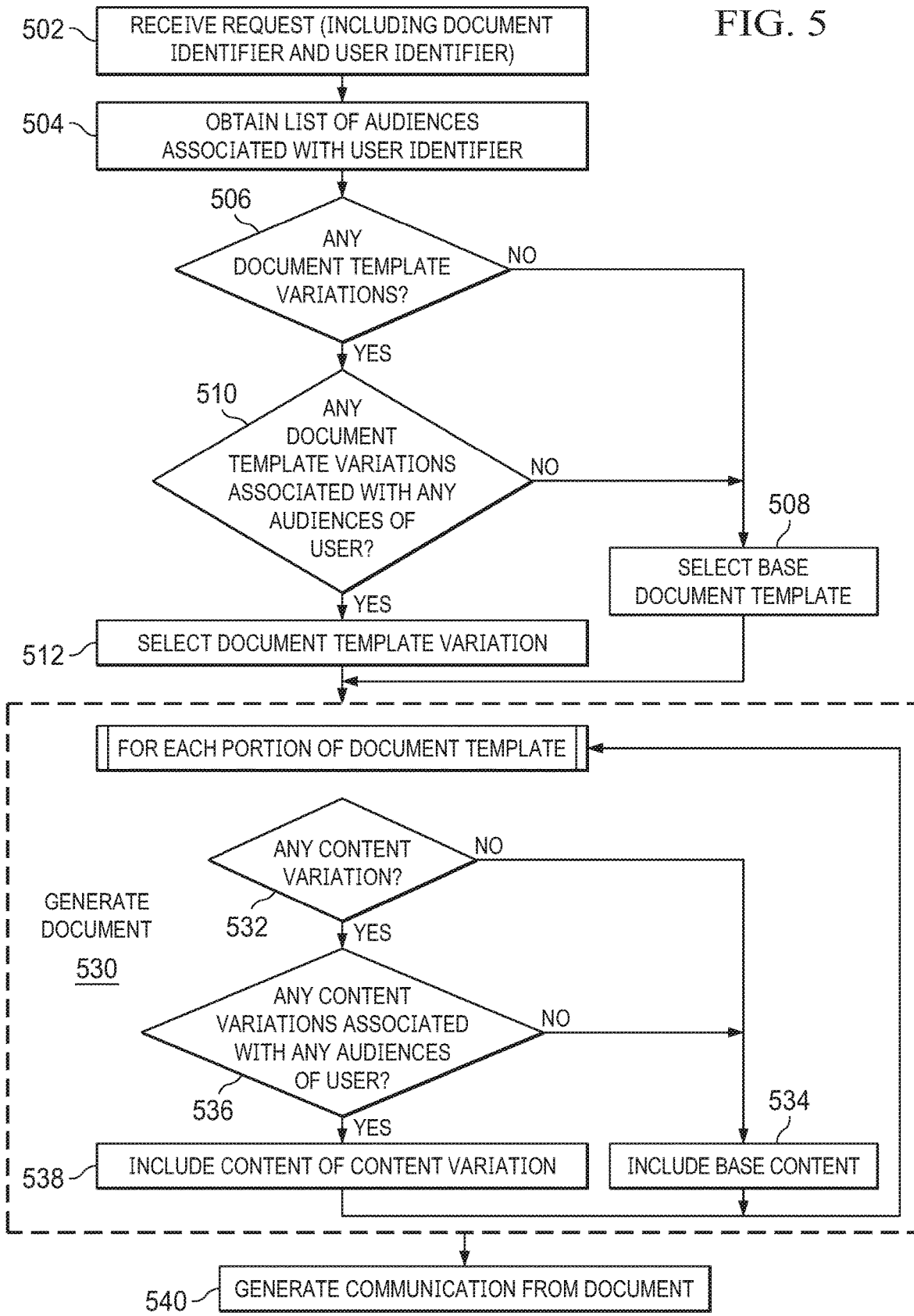
FIG. 5 is a flow diagram of one embodiment of a method for generating a audience targeted communication from a document template.

Moving now to FIG. 5, a flowchart illustrating one embodiment of a method for generating audience targeted documents and communications from a document template is depicted. An event such as a request to generate a communication for a user may be received (STEP 502), where the request may include an identifier of the document template to be used to generate the communication to the user along with an identifier for the user (e.g., a client ID for the user). Such a request may, for example, be initiated by a workflow engine or other application adapted to cause communications to users to be generated. To process such a document template to determine what content to include in the document based on the document template, attributes associated with the identified user may be obtained or such attributes associated with the identified user may be included in the request to generate the communication for the user (STEP 504). These attributes include the audiences associated with the user for whom the communication is being generated.

An example of such user attribute data in JavaScript Object Notation (JSON) format (e.g., that may be returned in response to a request for such user data, or included in a request to generate a document for a user) is:

```
{
    "itemId": "1582969058.1632241019",
    "itemType": "profile",
    "version": 19,
    "properties": {
        "lastName": "Nivlig",
        "optLetter": "false",
        "optEmail": "true",
        "optMorning": "false",
        "jobTitle": "",
        "optSms": "true",
        "optNight": "false",
        "firstName": "Enawd",
        "phoneNumber": "8594122102",
        "optAfternoon": "false",
        "company": "",
        "countryName": "",
        "optPhone": "false",
        "email": "nenawd@exampledomain.com"
    },
    "systemProperties": {
        "lastUpdated": "2021-09-29T14:36:09Z",
        "otdxcde:audiences": [
            {
                "audienceId": "187135462.UA-187135462-3.e7V50ACcTRO7Akl_fOSNoQ",
                "membershipStartDate": "2021-09-22T13:54:30Z",
                "otdxcde:type": "AudienceMembership"
            },
            {
                "audienceId": "187135462.UA-187135462-3._c3R_ugVRDGPZRC94iGHFg",
                "membershipStartDate": "2021-09-28T13:24:30Z",
                "otdxcde:type": "AudienceMembership"
            },
            {
                "audienceId": "187135462.UA-187135462-3.TyMUfNLvTcWz06G0QCX28A",
                "membershipStartDate": "2021-09-28T13:24:31Z",
                "otdxcde:type": "AudienceMembership"
            },
            {
                "audienceId": "187135462.UA-187135462-3.G8TKXp9nRKStKKFL_BTHlg",
                "membershipStartDate": "2021-09-28T13:24:32Z",
                "otdxcde:type": "AudienceMembership"
            },
            {
                "audienceId": "187135462.UA-187135462-3.w97_mzuCQBqe7FOC8u8sOQ",
                "membershipStartDate": "2021-09-28T13:24:33Z",
                "otdxcde:type": "AudienceMembership"
            }
        ]
    },
    "segments": [ ],
    "scores": { },
    "mergedWith": null,
    "consents": { }
}
```

Once the audiences associated with the user for whom the communication is being generated is obtained, it can be determined if the document template referenced by the document identifier has any content variations (e.g., document template variations) associated with the base template (STEP 506). If no such document template variations exist, (N branch of STEP 506) the base document template may be selected to generate a communication for the user (STEP 508).

If, however, such document template variations exist (Y branch of STEP 506) it can be determined if any of those document template variations have a content rule specifying an audience associated with the user (e.g., where the conditions of that content rule are met based on the audiences with which the user has been associated) (STEP 510). If the user does not meet any of the content rules associated with a document template variation based on the audiences with which the user is associated, (N branch of STEP 510) the base document template may be selected to generate a communication for the user (STEP 508). If the user does meet a content rule associated with a document template variation based on the audiences with which the user is associated, (Y branch of STEP 510) that document template variation may be selected to generate a communication for the user (STEP 512).

Once the document template (e.g., the base document template or a document template variation) to utilize to generate the communication for the user is determined, each portion of the document template may be iterated over to generate the document to be utilized for the communication (STEP 530). In particular, for each portion of the selected document template it can be determined if the portion has any content variations associated with the base content for that portion (STEP 532). If no such content variations exist, (N branch of STEP 532) the base content may be included in the document being generated for the user (STEP 534).

If, however, such content variations exist (Y branch of STEP 532) it can be determined if any of those content variations have a content rule specifying an audience associated with the user (e.g., where the conditions of that content rule are met based on the audiences with which the user has been associated) (STEP 536). If the user does not meet any of the content rules associated with a content variation based on the audiences with which the user is associated, (N branch of STEP 536) the base content is selected to include in the document (STEP 534). If the user does meet a content rules associated with a content variation based on the audiences with which the user is associated, (Y branch of STEP 536) the content of that content variation (e.g., associated with an audience with which the user is affiliated) may be selected to generate a communication for the user (STEP 538). The generated document can then be used to generate a communication from the document in one or more of a variety of formats (e.g., email output, print output, web page output or other output) (STEP 540).

It may now be helpful to an understanding of embodiments to discuss examples of interfaces that may be used to design document templates for audience targeted communications in embodiments of a CCM system. In particular, the depicted example is of audience target communications in the context of a life insurance company that desires to provide a custom insurance quote. Such a quote may, for example, be provided or tailored based on basic information provided by a web site visitor though a web site associated with the life insurance company or determined from the web site visitors interactions with the web site.

The insurance provider may be using an analytics platform to track audiences associated with users. For example, the web site it may be desired to, target, track, and segment web site visitors into four audience segments. These segments may be, for example, a general or baseline audience representing unknown interests that will represent a generic campaign for all unknown interests; a newly married individuals audience where it may be desirable to direct married couples to apply jointly for family discounts; a retired individuals audience where it may be desired to include content related to retirement income and options for cash value life insurance policy and an audience related to individuals with a growing family where content may encourage the user to explore whole life insurance as an option. As a user browses within the web site of the insurance company if they click and interact with material associated with those audience segments then they may be identified as affiliated with one of these segments (e.g., by an analytics platform). It will be noted that this information is not provided directly by the user but, instead, was determined by their interaction (e.g., browsing) within the web site and their browsing interactions.

The goal of implementing targeted communications in this example may be to provide an instant quote to the customer with content that will drive the user to father interaction with the insurance company or its web site. A designer associated with an insurance company in this example may desire to create a template that will provide the details of the simple insurance quote request from the website by allowing a communication with the requested quote to be generated from that document template, where the communication can target the four audience segments with appropriate content for each audience segment (e.g., generic unidentified interests, newly married couples, retired individuals, and users with a growing family).

Figure 6A:
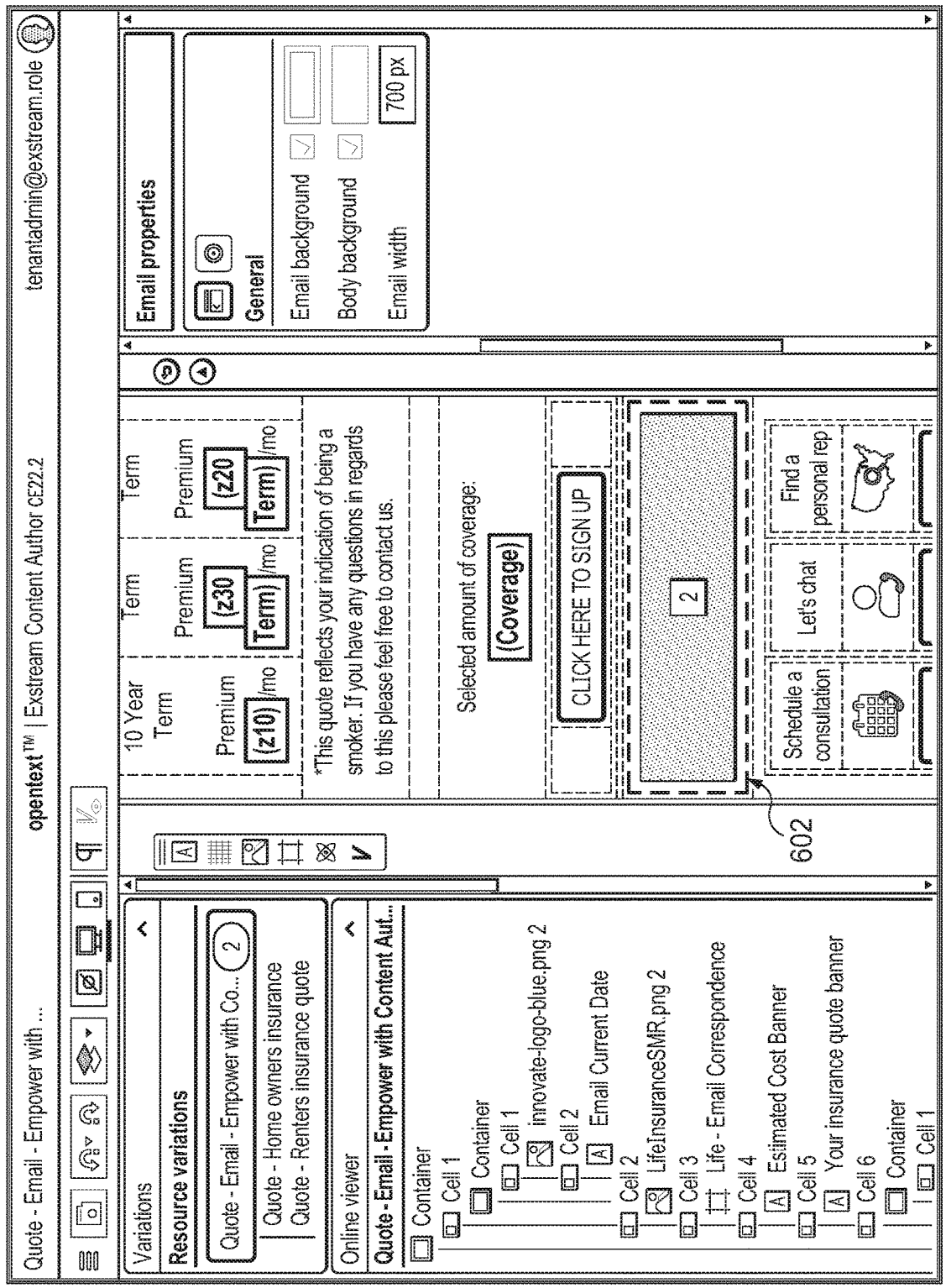
Figure 6B:
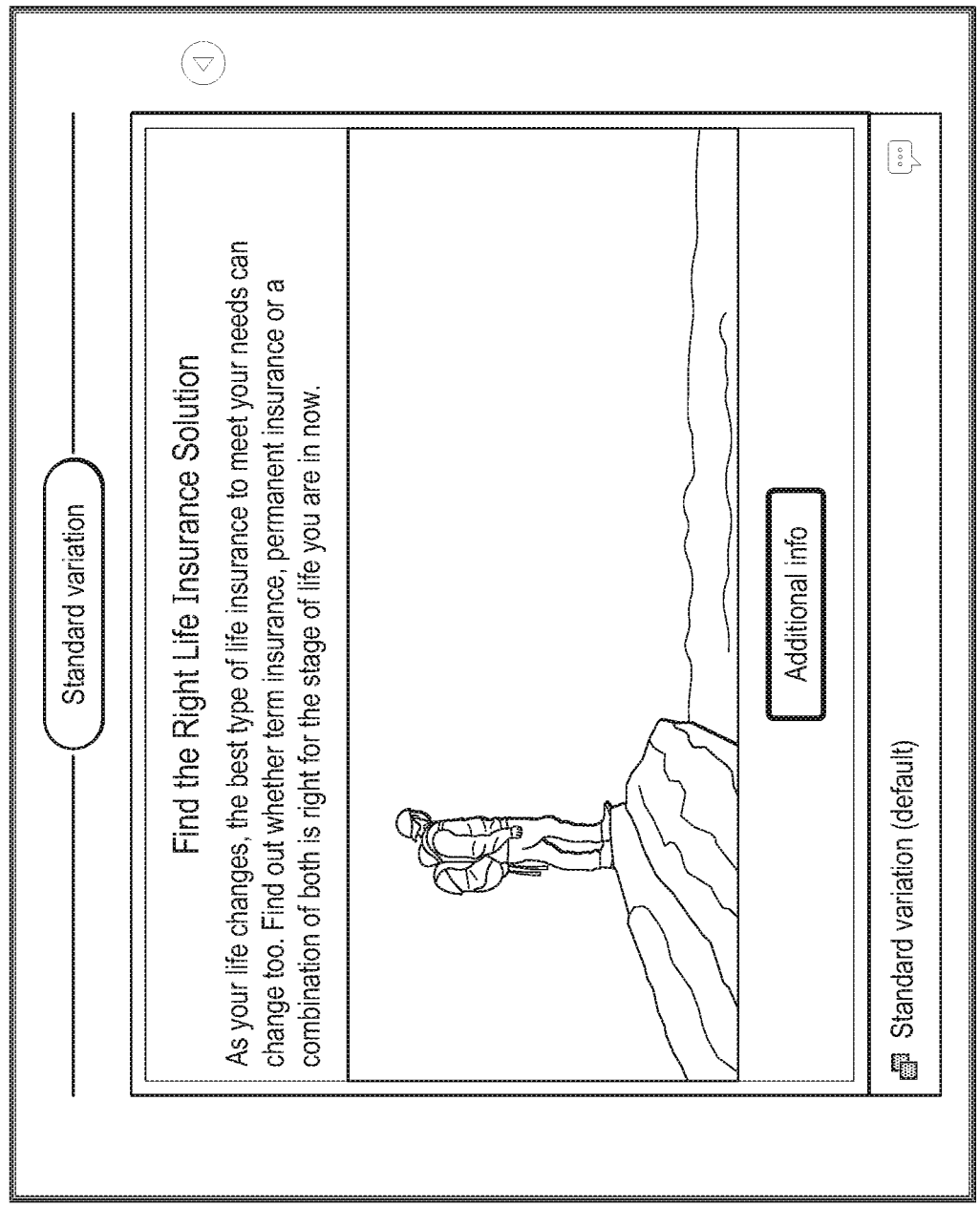

Referring first then to FIG. 6A, one embodiment of a designer interface for a document template designer is depicted. Here, a generic (or base) document template for an insurance quote is depicted. The authoring view allows the user to add content for audiences as well as any generic content. For example, the user may select a portion (e.g., portion 602) of the document template being designed and select or design content to be included in that area of the document template. As depicted in FIG. 6B, the user can select content to be included as the base (e.g., standard, generic, or default) content for that portion of the document template. Thus, this content may be shown in a document generated from this document template for any users of unknown or generic interest (e.g., if the user is not associated with an audience defined in a content rule for any other content variation associated with portion 602).

Figure 6C:
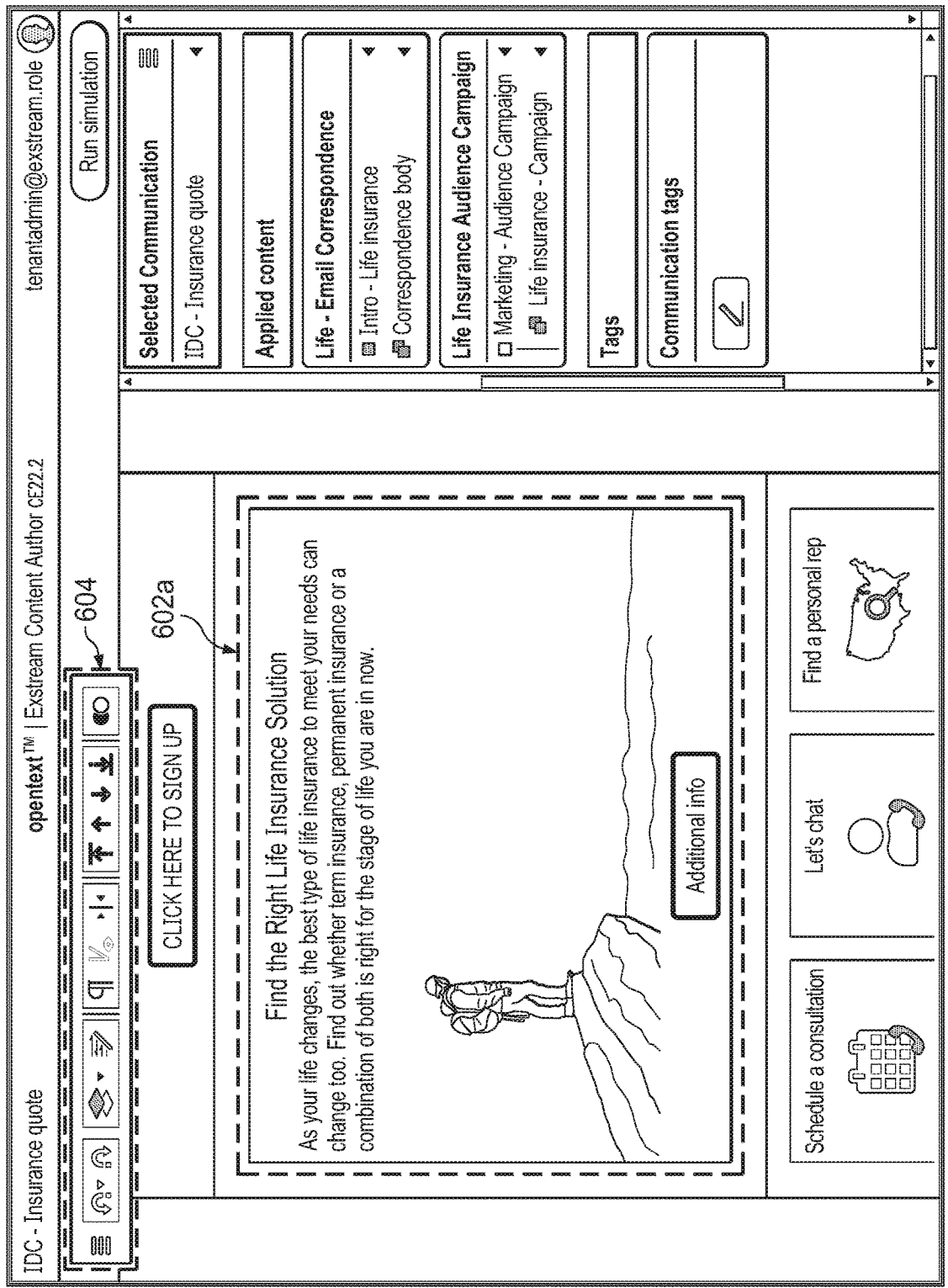

FIG. 6C depicts an embodiment of the designer interface where the base content has been populated in area 602a of the document template being designed. By interacting with (e.g., a button of) toolbar 604 presented in the designer interface, a designer (user) may be able to create a content variation for the content associated with highlighted portion 602a. When an interaction with (e.g., a content variation button of) toolbar 604 is detected by the designer, the designer may present an interface for a user to create a content rule associated with a selected audience. Specifically, the designer may obtain a list of available audiences and present the user with the set of audiences such that the user may select one of the presented audiences to be associated with the content variation being created. FIG. 6D depicts one embodiment of a designer interface for presenting audiences and allowing a user to select an audience for a content variation. In the example depicted, the user has selected the "Growing Family" audience to be associated with the content variation being created. Thus, a content rule for the content variation may be defined for that content variation indicating that a user associated with the "Growing Family" audience should be shown the content of this content variation.

Figure 6E:
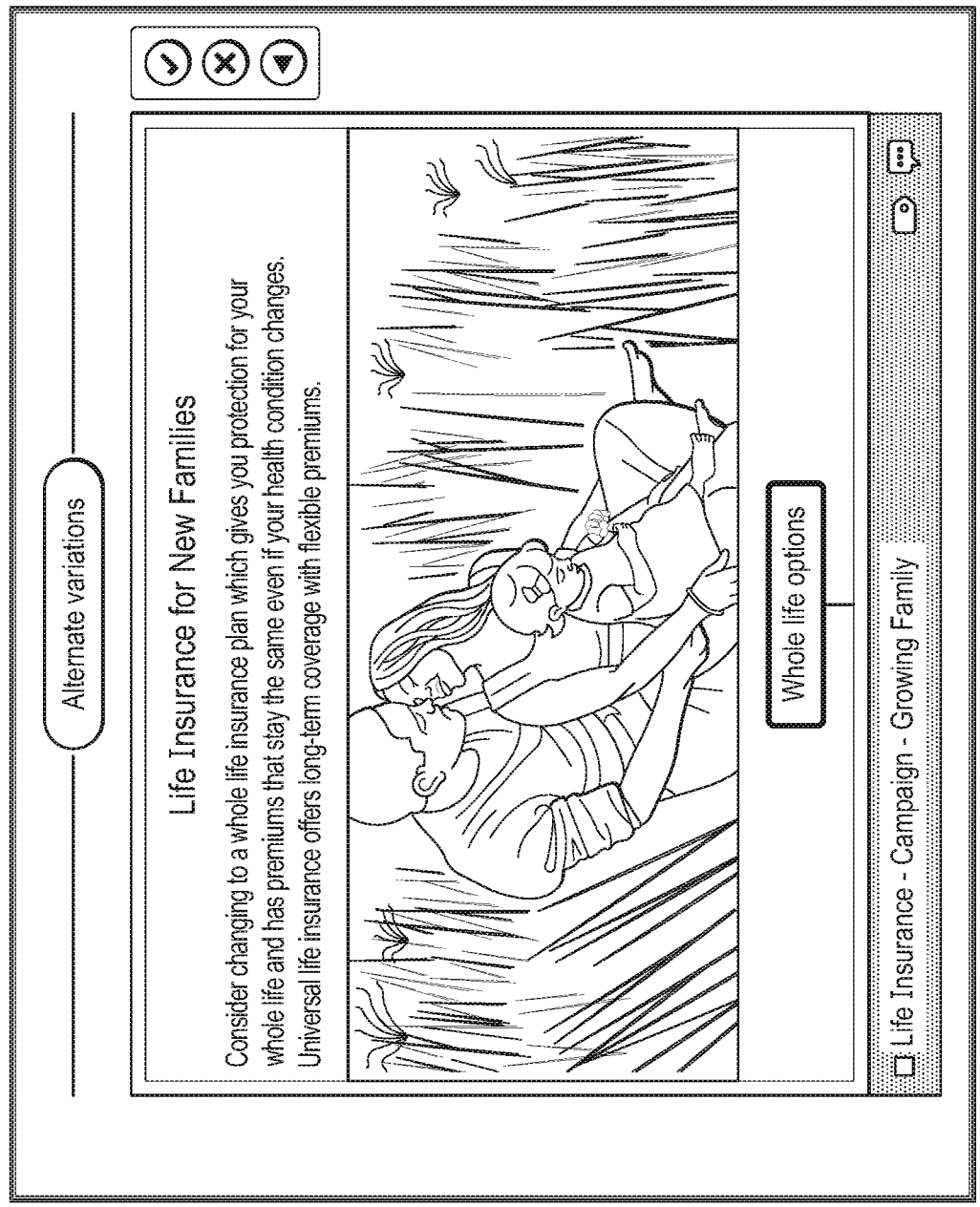
Figure 6F:
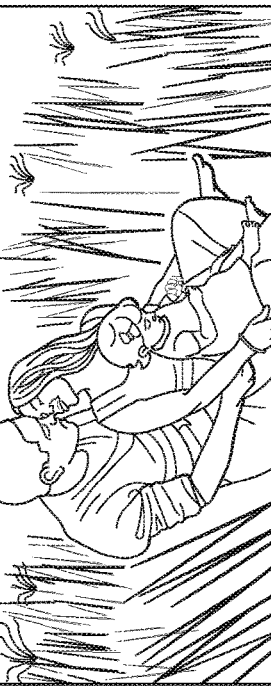

The designer can then present an interface for allowing a user to select or design content to be associated with the content variation being created (e.g., in this example, a content variation for the "Growing Family" audience and associated content rule). An example of such an interface is depicted in FIG. 6E. This selected content for the content variation can then be associated with the content variation and the content variation for that content is depicted in the template in the designer interface as depicted in portion 602b in FIG. 6F. Thus, this content of the content variation may be shown in a document generated from this document template (e.g., an insurance quote) for any users affiliated with the Growing Family audience.

Figure 6G1:
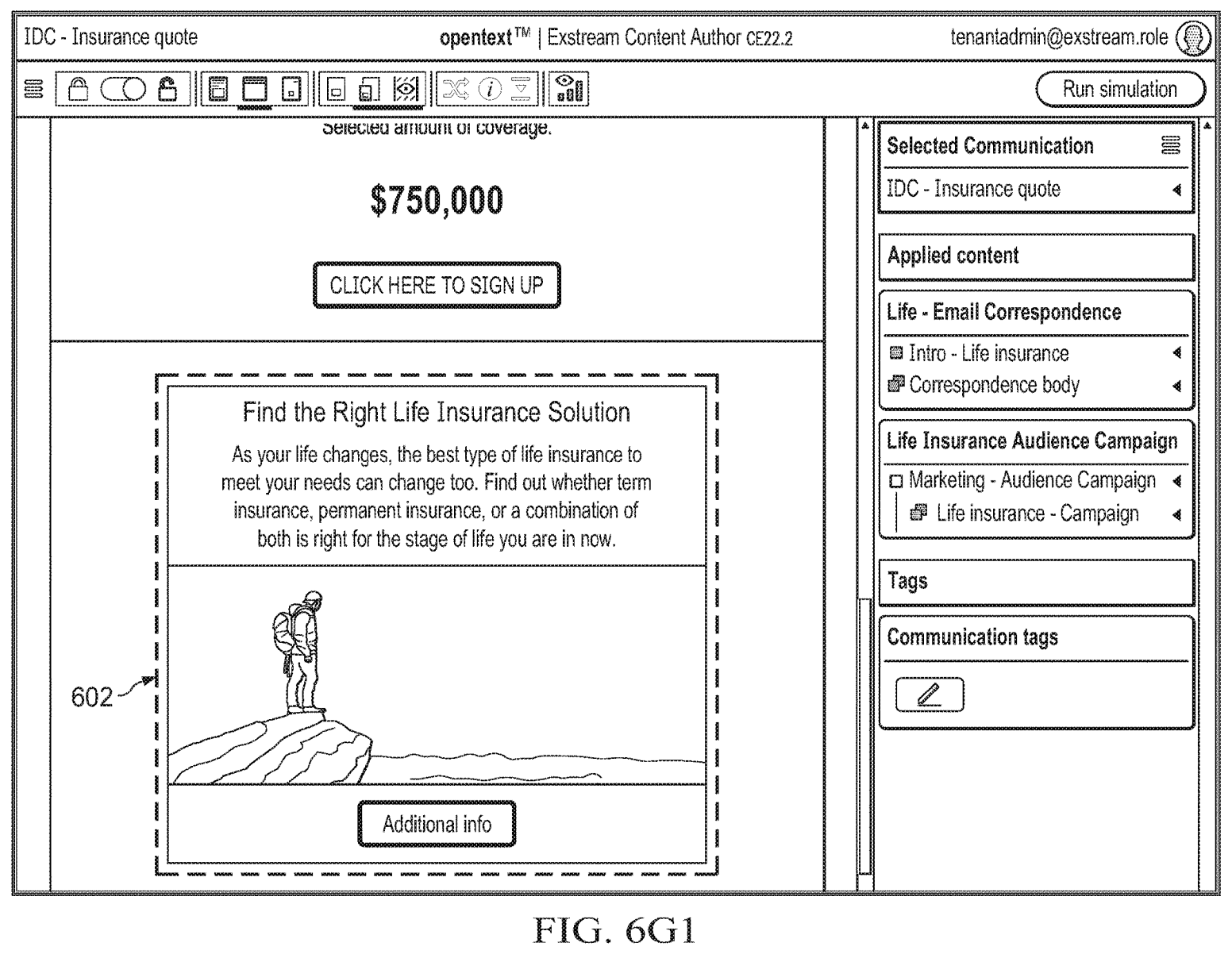

As depicted in the example of the designer interface in FIG. 6G, a user can similarly design content variations (e.g., defining a content rule indicating the audience and associated content to be included in a generated document) for portion 602 of the document template for each desired audience (e.g., generic/standard/unidentified interest, growing family, newly married (marriage), retired individuals (retirees)). The designer interface may present the content of each of these content variations when the portion 602 is highlighted in the designer interface.

Accordingly, when a communication is generated from such a document template, attributes of the user may be obtained and when the document is generated from the document template the content variations defined for portion 602 can be evaluated based on the user attributes to determine if any content rule for those content variation is met by the user attributes (e.g., if a user is associated with a growing family, newly married (marriage) or retired individuals (retirees) audience). If the user is not associated with any of those audiences, the standard content may be shown in portion 602 of the document generated for the communication as depicted in FIG. 6H. Alternatively, if the user is associated with one of the audiences, the corresponding content defined for that content variation may be s shown in portion 602 of the document generated for the communication as depicted. For example, FIG. 6I depicts a communication generated for a user associated with the "Growing Family" audience and including the content defined for this content variation in the portion 602 of the generated document.

Figure 6J:
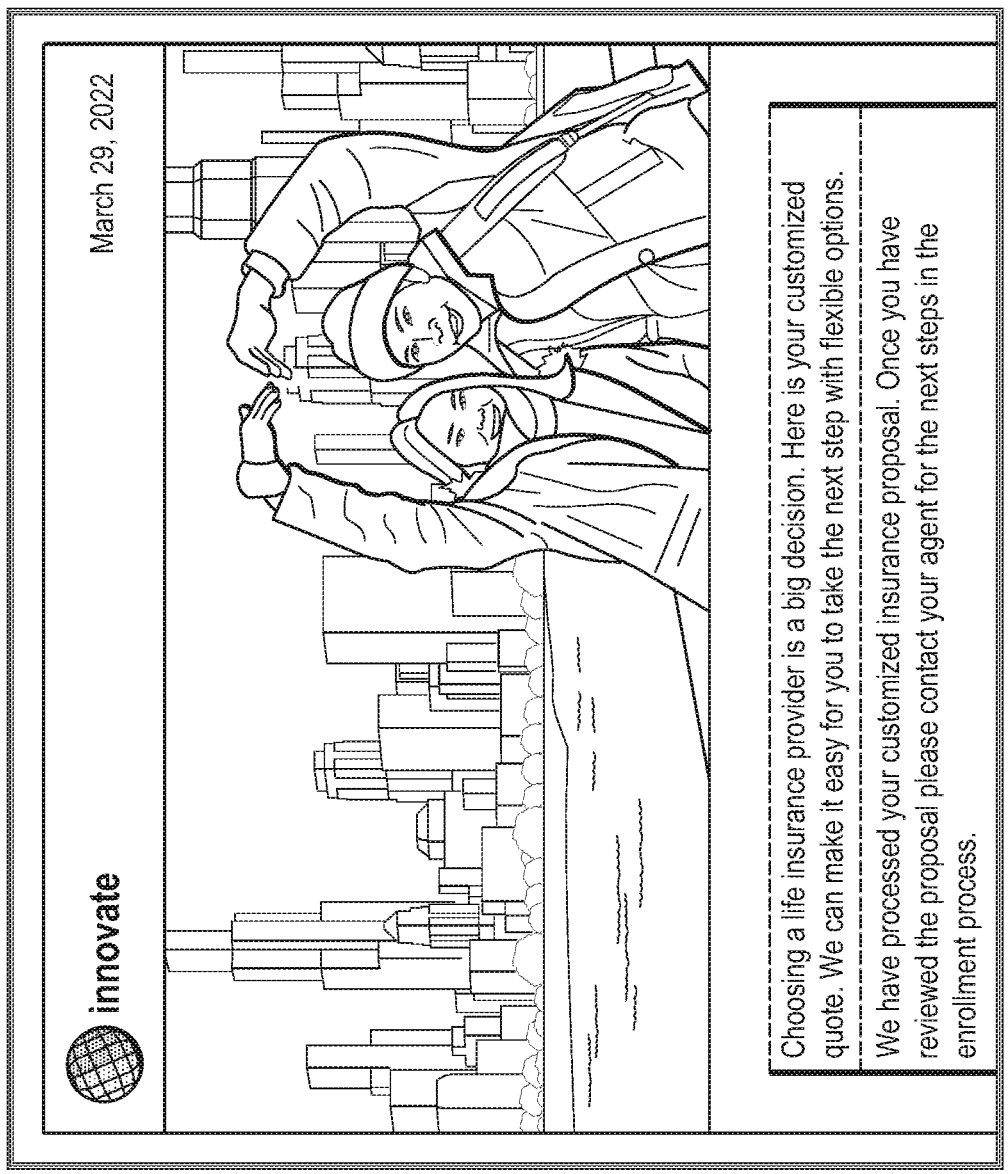
Figure 6K:
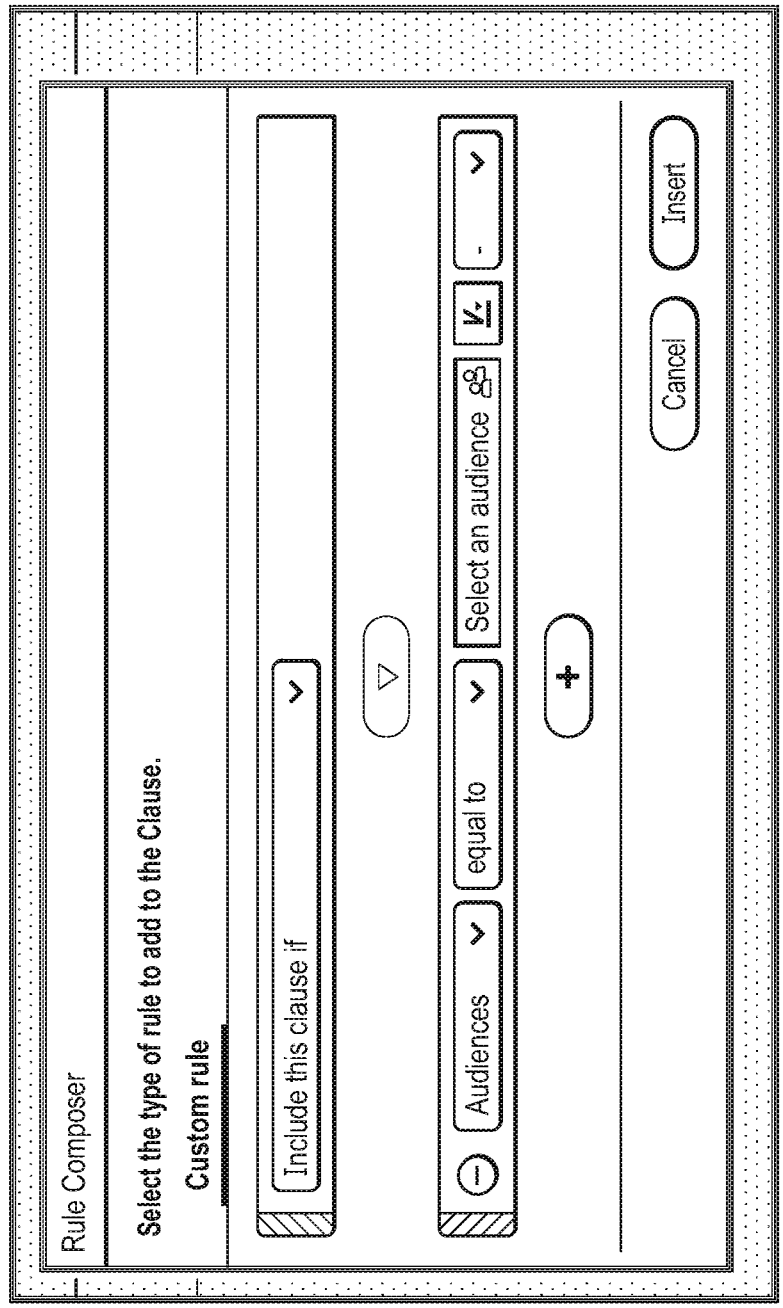

While examples of defining content variations for a portion of a document template have been discussed, it may be especially noted that embodiments may also allow the definition of content rules at almost any level of granularity desired (e.g., the portion for which a content variation may be defined may be as small as a word of format for a word appearing in document template and as large as the entire document template). As an example, FIGS. 6J, 6K and 6L depict example designer interface for the definition of a content variation for a clause of text in a document template.

Figure 7:
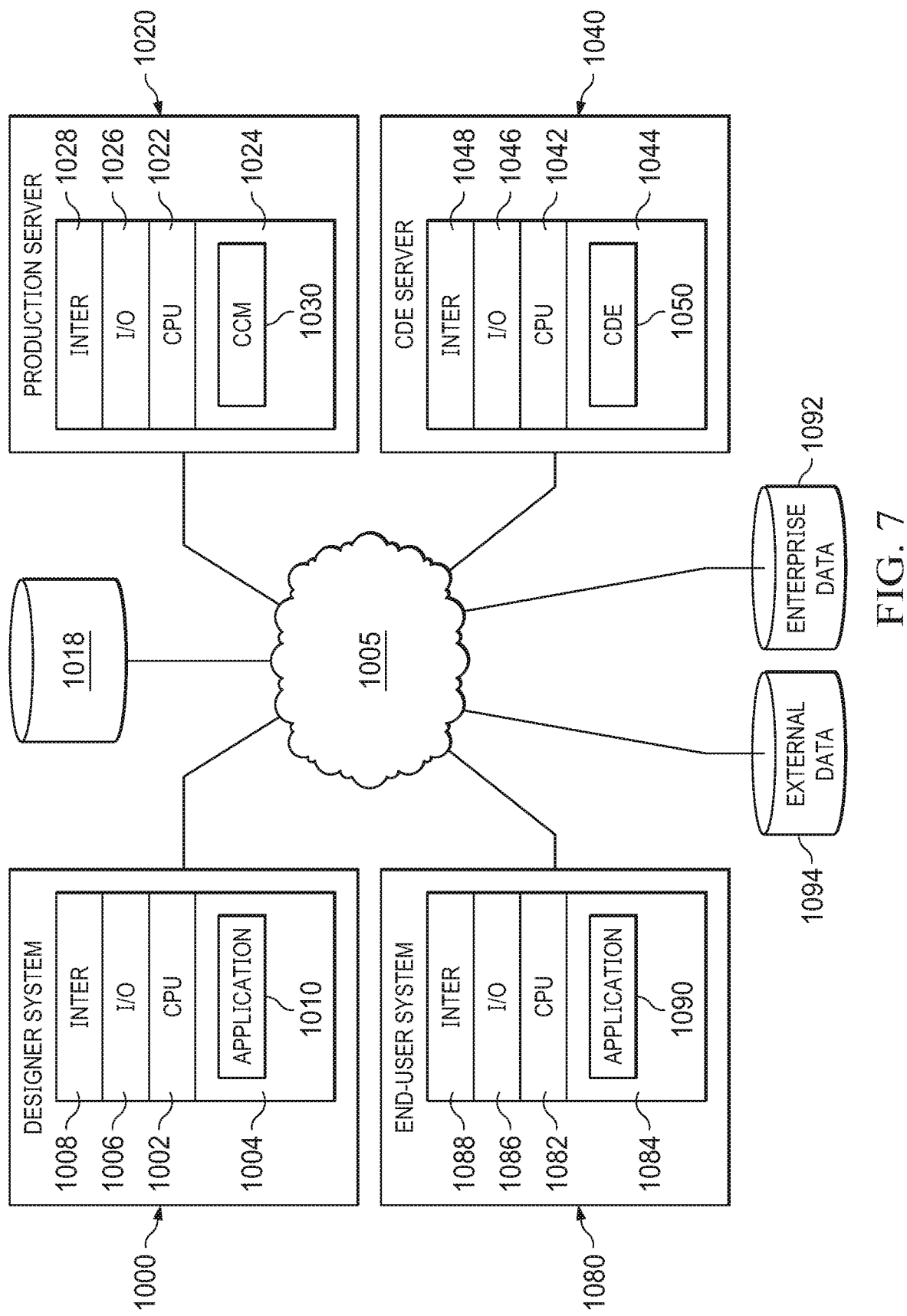
FIG. 7 is a diagrammatic representation of one embodiment of a distributed network computing environment.

Embodiments as disclosed, or portions thereof, may be implemented on a computing system. Any combination of mobile desktop, server machine, cloud deployed servers (virtual or actual) or containers, embedded or other types of hardware, etc. may be used as such computing systems. FIG. 7 is a diagrammatic representation of one embodiment of a distributed network computing environment where embodiments disclosed herein can be implemented. The computing environment includes a designer computer system 1000, a production server computer system 1020, and an end-user computer system 1080 connected to a network 1005 (e.g., a local area network (LAN), a wide area network (WAN) such as the Internet, mobile network, or other type of network or combination thereof). Network 1005 can represent a combination of wired and wireless networks that network computing environment may utilize for various types of network communications.

Designer computer system 1000 is one embodiment of a designer system, and end-user computer system 1080 is one embodiment of a user system. Production server computer system 1020 is one embodiment of a production server. Customer data computer 1040 is one embodiment of a customer data engine 1050.

Designer computer system 1000 includes, for example, a computer processor 1002 and associated memory 1004. Computer processor 1002 may be an integrated circuit for processing instructions, such as, but not limited to a CPU. For example, processor 1002 may comprise one or more cores or micro-cores of a processor. Memory 1004 may include volatile memory, non-volatile memory, semi-volatile memory, or a combination thereof. Memory 1004, for example, may include RAM, ROM, flash memory, a hard disk drive, a solid-state drive, an optical storage medium (e.g., CD-ROM), or other computer readable memory or combination thereof. Memory 1004 may implement a storage hierarchy that includes cache memory, primary memory, or secondary memory. In some embodiments, memory 1004 may include storage space on a data storage array. Designer computer system 1000 may also include input/output ("I/O") devices 1006, such as a keyboard, monitor, printer, electronic pointing device (e.g., mouse, trackball, stylus, etc.), or the like. Designer computer system 1000 may also include a communication interface 1008, such as a network interface card, to interface with network 1005.

Memory 1004 stores instructions executable by processor 1002. For example, memory 1004 may include a design application 1010 executable to allow a user to design a conversation-enabled application. Designs may be stored to a design data store 1018. Design data store 1018 may comprise a database, file system, other type of data store or combination thereof. According to one embodiment, design data store may be implemented by a DAM system, CMS, WCM system, or ECM system. Design data store 1018 is one embodiment of a design data store 104.

Production server computer system 1020 includes, for example, a computer processor 1022 and associated memory 1024. Computer processor 1022 may be an integrated circuit for processing instructions, such as, but not limited to a CPU. For example, processor 1022 may comprise one or more cores or micro-cores of a processor. Memory 1024 may include volatile memory, non-volatile memory, semi-volatile memory, or a combination thereof. Memory 1024, for example, may include RAM, ROM, flash memory, a hard disk drive, a solid-state drive, an optical storage medium (e.g., CD-ROM), or other computer readable memory or combination thereof. Memory 1024 may implement a storage hierarchy that includes cache memory, primary memory, or secondary memory. Production server computer system 1020 may also include I/O devices 1026, such as a keyboard, monitor, printer, electronic pointing device (e.g., mouse, trackball, stylus, etc.), or the like. Production server computer system 1020 may also include a communication interface 1028, such as a network interface card, to interface with network 1005.

Memory 1024 stores instructions executable by processor 1022. For example, memory 1024 may include a CCM software 1030 executable to process designs from design store 1018 to generate conversation-enabled documents and render the conversation enabled documents to a number of outputs. According to one embodiment, CCM software 1030 is executable to provide a CCM engine that can pull data from a variety of enterprise data sources 1092 and external data sources 1094.

According to one embodiment, CCM software 1030 is executable to render a conversation-enabled document to a conversation-enabled document store 1038. Conversation-enabled document store 1038 may comprise a database, file system, other type of data store or combination thereof. According to one embodiment, conversation-enabled store 1038 may be implemented by a DAM system, CMS, WCM system, or ECM system.

CDE computer system 1040 includes, for example, a computer processor 1042 and associated memory 1044. Computer processor 1042 may be an integrated circuit for processing instructions, such as, but not limited to a CPU. For example, processor 1042 may comprise one or more cores or micro-cores of a processor. Memory 1044 may include volatile memory, non-volatile memory, semi-volatile memory, or a combination thereof. Memory 1044, for example, may include RAM, ROM, flash memory, a hard disk drive, a solid-state drive, an optical storage medium (e.g., CD-ROM), or other computer readable memory or combination thereof.

Memory 1044 may implement a storage hierarchy that includes cache memory, primary memory, or secondary memory. Conversation-enabled document computer system 1040 may also include I/O devices 1046, such as a keyboard, monitor, printer, electronic pointing device (e.g., mouse, trackball, stylus, etc.), or the like. Customer data engine server 1040 may also include a communication interface 1048, such as a network interface card, to interface with network 1005.

Memory 1044 stores instructions executable by processor 1042. For example, memory 1044 may include a customer data engine 1050 for obtaining audience data from an analytics platform, store user profiles, correlating user profiles with audience data, and to allow access to such data through an interface, such as a services interface or the like.

End-user computer system 1080 includes, for example, a computer processor 1082 and associated memory 1084. Computer processor 1082 may be an integrated circuit for processing instructions, such as, but not limited to a CPU. For example, processor 1082 may comprise one or more cores or micro-cores of a processor. Memory 1084 may include volatile memory, non-volatile memory, semi-volatile memory, or a combination thereof. Memory 1084, for example, may include RAM, ROM, flash memory, a hard disk drive, a solid-state drive, an optical storage medium (e.g., CD-ROM), or other computer readable memory or combination thereof. Memory 1084 may implement a storage hierarchy that includes cache memory, primary memory, or secondary memory. In some embodiments, memory 1084 may include storage space on a data storage array. End-user computer system 1080 may also include I/O devices 1086, such as a keyboard, monitor, printer, electronic pointing device (e.g., mouse, trackball, stylus, etc.), or the like. End-user computer system 1080 may also include a communication interface 1088, such as a network interface card, to interface with network 1005.

Memory 1084 stores instructions executable by processor 1082. For example, memory 1084 may include an application 1090 executable to allow a user to participate in a conversation. According to one embodiment, application 1090 is a web browser.

Those skilled in the relevant art will appreciate that the invention can be implemented or practiced with other computer system configurations including, without limitation, cloud deployed computing systems or server (E.g., either physical or virtual), multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention.

Rather, the description is intended to describe illustrative embodiments, features and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods, or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method for generating user specific communications based on audience affiliation, comprising:
    obtaining a user profile comprising user data determined based on user interactions over a computer network;
    obtaining first audience data determined at an audience platform, the audience data comprising a set of audiences, each audience associated with a set of audience attributes;
    receiving an event associated with a user;
    obtaining a first communication template, the first communication template associated with a rule for content selection for communications generated from the communication template, wherein the rule defines first content and an associated audience
    correlating the user profile for the user with the first obtained audience data based on the audience attributes to determine the user is affiliated with the associated audience;
    generating a first communication tailored to the user based on the communication template and the determination that the user is affiliated with the associated audience of the rule, wherein the user tailored communication includes the first content associated with the rule;
    sending the first communication to the user over a first communication channel;
    determining a second event has associated with the user, wherein the second event occurs subsequently to the first event;
    obtaining second audience data associated with the user determined at the audience platform;
    obtaining a second communication template, the second communication template associated with a second rule for content selection for communications generated from the second communication template, wherein the second rule is associated with second content and the associated audience;
    correlating the user profile for the user with the obtained second audience data based on the audience attributes to determine the user is no longer affiliated with the associated audience;
    generating a second communication tailored to the user based on the second communication template and the determination that the user is no longer affiliated with the associated audience of the rule, wherein the second communication excludes the second content defined by the rule; and
    sending the second communication to the user over a second communication channel.

2. The method of claim 1, wherein the first event or the second event are an expiration of a time period.

3. The method of claim 1, wherein the second event is an interaction with the first communication specific to the user.

4. The method of claim 1, wherein the second communication channel is different than the first communication channel.

5. The method of claim 1, wherein the user profile comprises data provided by the user.

6. A system for generating user specific communications based on audience affiliation, comprising:
    a processor;
    a non-transitory computer readable medium, comprising instructions for:
    obtaining a user profile comprising user data determined based on user interactions over a computer network;
    obtaining first audience data determined at an audience platform, the audience data comprising a set of audiences, each audience associated with a set of audience attributes;
    receiving an event associated with a user;
    obtaining a first communication template, the first communication template associated with a rule for content selection for communications generated from the communication template, wherein the rule defines first content and an associated audience
    correlating the user profile for the user with the first obtained audience data based on the audience attributes to determine the user is affiliated with the associated audience;
    generating a first communication tailored to the user based on the communication template and the determination that the user is affiliated with the associated audience of the rule, wherein the user tailored communication includes the first content associated with the rule;
    sending the first communication to the user over a first communication channel;
    determining a second event has associated with the user, wherein the second event occurs subsequently to the first event;
    obtaining second audience data associated with the user determined at the audience platform;
    obtaining a second communication template, the second communication template associated with a second rule for content selection for communications generated from the second communication template, wherein the second rule is associated with second content and the associated audience;

correlating the user profile for the user with the obtained second audience data based on the audience attributes to determine the user is no longer affiliated with the associated audience;

generating a second communication tailored to the user based on the second communication template and the determination that the user is no longer affiliated with the associated audience of the rule, wherein the second communication excludes the second content defined by the rule; and sending the second communication to the user over a second communication channel.

7. The system of claim 6, wherein the first event or the second event are an expiration of a time period.

8. The system of claim 6, wherein the second event is an interaction with the first communication specific to the user.

9. The system of claim 6, wherein the second communication channel is different than the first communication channel.

10. The system of claim 6, wherein the user profile comprises data provided by the user.

11. The method of claim 1, wherein the first communication template and the second communication template are different templates.

12. The system of claim 6, wherein the first communication template and the second communication template are different templates.

13. A non-transitory computer readable medium, comprising instructions for:
    obtaining a user profile comprising user data determined based on user interactions over a computer network;
    obtaining first audience data determined at an audience platform, the audience data comprising a set of audiences, each audience associated with a set of audience attributes;
    receiving an event associated with a user;
    obtaining a first communication template, the first communication template associated with a rule for content selection for communications generated from the communication template, wherein the rule defines first content and an associated audience
    correlating the user profile for the user with the first obtained audience data based on the audience attributes to determine the user is affiliated with the associated audience;
    generating a first communication tailored to the user based on the communication template and the determination that the user is affiliated with the associated audience of the rule, wherein the user tailored communication includes the first content associated with the rule;
    sending the first communication to the user over a first communication channel;
    determining a second event has associated with the user, wherein the second event occurs subsequently to the first event;
    obtaining second audience data associated with the user determined at the audience platform;
    obtaining a second communication template, the second communication template associated with a second rule for content selection for communications generated from the second communication template, wherein the second rule is associated with second content and the associated audience;
    correlating the user profile for the user with the obtained second audience data based on the audience attributes to determine the user is no longer affiliated with the associated audience;
    generating a second communication tailored to the user based on the second communication template and the determination that the user is no longer affiliated with the associated audience of the rule, wherein the second communication excludes the second content defined by the rule; and
    sending the second communication to the user over a second communication channel.

14. The non-transitory computer readable medium of claim 13, wherein the first event or the second event are an expiration of a time period.

15. The non-transitory computer readable medium of claim 13, wherein the second event is an interaction with the first communication specific to the user.

16. The non-transitory computer readable medium of claim 13, wherein the second communication channel is different than the first communication channel.

17. The non-transitory computer readable medium of claim 13, wherein the user profile comprises data provided by the user.

18. The non-transitory computer readable medium of claim 13, wherein the first communication template and the second communication template are different templates.

* * * * *